United States Patent [19]

Servanty

[11] Patent Number: 5,100,080
[45] Date of Patent: Mar. 31, 1992

[54] ROTOR FOR DEVELOPING SUSTAINING AND PROPELLING FORCES IN A FLUID, STEERING PROCESS, AND AIRCRAFT EQUIPPED WITH SUCH ROTOR

[76] Inventor: Pierre Servanty, 14 Avenue Jean-Jacques Rousseau, 93600 Aulnay Sous Bois, France

[21] Appl. No.: 508,986

[22] Filed: Apr. 12, 1990

[30] Foreign Application Priority Data

Apr. 17, 1989 [FR] France ................. 89 05185

[51] Int. Cl.$^5$ .................. B64C 39/08; B64C 11/30
[52] U.S. Cl. .................................. 244/9; 244/70; 440/93; 416/147
[58] Field of Search ............... 416/147, 166, 162, 155; 440/92, 93; 244/9, 19, 20, 70

[56] References Cited

U.S. PATENT DOCUMENTS 4,194,707 3/1980 Sharpe ......................... 244/9
4,752,258 6/1988 Hochleitner et al. ........... 440/93

Primary Examiner—Sherman Basinger
Assistant Examiner—Virna Lissi Mojica
Attorney, Agent, or Firm—Harold H. Dutton, Jr.

[57] ABSTRACT

The invention relates to a rotor able to develop in a fluid lifting and/or propelling forces and its process for control. Said rotor comprises several profiled blades (9) with axes parallel to the drive axis (3); the incidence of each profiled blade is controlled in real time as a function of its angular azimuth and the flight conditions, for obtaining the desired lift and propulsion forces.

19 Claims, 15 Drawing Sheets

Fig. 8

| $\dfrac{P}{\rho C W^2}$ ($m^4$) | $\dfrac{T}{\rho W^2}$ ($m^4$) | Phi12 (°) | Phi11 (°) |
|---|---|---|---|
| 0.0 | 0.0 | 90 | 90 |
| 0.0 | -2.5 | 94 | 86 |
| 0.0 | -5.0 | 97 | 83 |
| 0.0 | -7.5 | 101 | 79 |
| 0.0 | -10.0 | 106 | 74 |
| 0.0 | -12.5 | 109 | 71 |
| 0.0 | -15.0 | 114 | 66 |
| 0.0 | -17.5 | 118 | 62 |
| 0.0 | -20.0 | 123 | 57 |
| 0.0 | -22.5 | 129 | 51 |
| 0.0 | -25.0 | 136 | 44 |
| 0.0 | -27.5 | 144 | 36 |
| 0.0 | -30.0 | 165 | 15 |
| 5.0 | 0.0 | 95 | 91 |
| 5.0 | -5.0 | 103 | 88 |
| 5.0 | -7.5 | 108 | 84 |
| 5.0 | -10.0 | 111 | 80 |
| 5.0 | -12.5 | 116 | 77 |
| 5.0 | -15.0 | 121 | 73 |
| 5.0 | -20.0 | 134 | 65 |
| 5.0 | -22.5 | 142 | 61 |
| 5.0 | -25.0 | 155 | 56 |
| 10.0 | 0.0 | 100 | 100 |
| 10.0 | -2.5 | 104 | 96 |
| 10.0 | -5.0 | 108 | 93 |
| 10.0 | -7.5 | 113 | 90 |
| 10.0 | -10.0 | 118 | 86 |
| 10.0 | -12.5 | 124 | 82 |
| 10.0 | -15.0 | 130 | 79 |
| 10.0 | -17.5 | 138 | 76 |
| 10.0 | -20.0 | 150 | 72 |
| 15.0 | 0.0 | 104 | 104 |
| 15.0 | -2.5 | 109 | 101 |
| 15.0 | -5.0 | 114 | 98 |
| 15.0 | -7.5 | 119 | 95 |
| 15.0 | -10.0 | 125 | 91 |
| 15.0 | -12.5 | 132 | 88 |
| 15.0 | -15.0 | 140 | 85 |
| 20.0 | 0.0 | 109 | 109 |
| 20.0 | -2.5 | 115 | 106 |
| 20.0 | -5.0 | 120 | 103 |
| 20.0 | -7.5 | 127 | 100 |
| 20.0 | -10.0 | 135 | 97 |
| 20.0 | -12.5 | 146 | 94 |
| 25.0 | 0.0 | 114 | 114 |
| 25.0 | -2.5 | 121 | 111 |
| 25.0 | -5.0 | 127 | 108 |
| 25.0 | -7.5 | 136 | 105 |
| 25.0 | -10.0 | 149 | 102 |
| 30.0 | 0.0 | 120 | 120 |
| 30.0 | -2.5 | 127 | 117 |
| 30.0 | -5.0 | 136 | 114 |
| 30.0 | -7.5 | 149 | 111 |
| 35.0 | 0.0 | 125 | 125 |
| 35.0 | -2.5 | 134 | 122 |
| 35.0 | -5.0 | 147 | 119 |
| 40.0 | 0.0 | 131 | 131 |
| 40.0 | -2.5 | 143 | 128 |
| 45.0 | 0.0 | 138 | 138 |
| 50.0 | 0.0 | 146 | 146 |
| 55.0 | 0.0 | 155 | 155 |
| 60.0 | 0.0 | 174 | 174 |

$R = 1{,}1\,m$ $r = 0{,}4\,m$ $E = 3{,}5\,m$ $n = 5$ $w = 3{,}15\,tr\,s$ $a = 0{,}2269$ $A = -1{,}258 \cdot 10^{-2}\,m^2$ $B = 4{,}891 \cdot 10^{-1}\,m^2$ $C_1 = 6{,}233 \cdot 10^{-3}\,m^3$ Précision sur $\varphi_{11}$ et $\varphi_{12}$ : $\pm 1°$ Boucle synchronisée par l'horloge 20 de période t h = tω

ROTOR FOR DEVELOPING SUSTAINING AND PROPELLING FORCES IN A FLUID, STEERING PROCESS, AND AIRCRAFT EQUIPPED WITH SUCH ROTOR

This invention relates to an improved rotor assembly, hereinafter referred to as a "rotor", comprising at least one profiled wing and intended to be caused to rotate in a fluid in order to develop sustaining and/or propelling forces. The invention also relates to a steering process for said rotor permitting controlling at each instant the movement of the profiled wings in order to obtain desired aerodynamic (or hydrodynamic) forces. The invention applies in particular in the aeronautical field for the production of aircraft.

BACKGROUND AND OBJECTS OF THE INVENTION

Helicopters are known which have a rotor comprising vanes caused to rotate about an axis perpendicular to their longitudinal direction; each section of the vane is thus driven with a linear speed relatively proportional to its distance from the axis of rotation. Under these conditions, the sustaining and/or propelling forces produced, relative to the swept surface, remain limited by aerodynamic phenomena (maximum speed at the tip of the vane, very low efficiency near the hub, ...) and it therefor follows that the energy efficiency of this type of rotor is limited (specific lift on the order of 40 to 50 Newtons per horsepower.)

Another type of rotor has been the object of study, and one can refer for example to the following patents which describe examples thereof: French patents 2,375,090, 2,309,401, 2,181,486 and 2,080,452. These rotors comprise profiled vanes or wings (hereinafter referred to as "profiled wings" by reason of their arrangement with respect to the flow of fluid which is similar to that of the wings of airplanes) which are caused to rotate about an axis parallel to their longitudinal direction. Under these conditions, each profiled wing section works under the same aerodynamic conditions (identical speed, incidence, circulation). One would therefor expect that this type of rotor would benefit from an aerodynamic efficiency which is much superior to that of helicopter rotors. However, in this type of rotor, each profiled wing is brought during its rotation to follow a rule or law of incidence which determines the performances of the rotor and the theory behind known rotors of this type directs a fixed rule of incidence, that is, one which repeats indefinitely, identically to itself: the relatively arbitrary choice of this rule (in particular imposed by technological constraints) cannot in any case in known rotors of this type, permit optimizing the efficiency when the operating conditions vary (speed of rotation of the rotor, speed of advance, relative incidence of the air ... ). Further, these rotors of fixed kinetics are unusable in practice since, in the given operating conditions, they impose the intensity and/or the direction of the aerodynamic force produced and do not permit producing the necessary modulations for an effective steering of the aircraft. Further, even in the theoretical scheme, the prior documents which describe this type of rotor do not provide any suggestions which would permit adjusting the law of incidence to the desired forces.

The present invention seeks to overcome the deficiencies of known rotors of the aforementioned type having profiled blades or wings rotating about an axis parallel to the longitudinal direction of the profiled wings. The invention seeks to benefit fully from the advantages that may be expected from this type of rotor, in particular improved aerodynamic efficiency with respect to that of helicopter rotors.

One of the objects of the invention is in particular to provide an improved rotor having profiled wings or blades, the incidence of which is adjustable in real time according to a non-fixed rule.

Another object is to provide a process for steering said rotor, permitting at each instant controlling the rule of incidence of each profiled wing for obtaining sustaining and/or propelling forces desired at the moment considered, with an optimum energy efficiency.

DESCRIPTION OF THE INVENTION

The rotor provided by the invention, which is intended to be attached to an airframe movable in a fluid for exerting thereon sustaining and/or propelling forces, is of the type comprising a supporting structure mounted on the airframe in such a manner as to be able to be rotatingly driven about an axis of rotation (O) and at least one profiled wing extending parallel to the axis of rotation (O) and articulated about its supporting structure by a pivot connection of the axis (B) essentially parallel to said axis of rotation (O) at a speed of rotation: the controlling process according to the invention comprises:

storing preliminarily data representative of the following structural parameters of the rotor: n (number of profiled wings of the rotor); E (the span of each profiled wing); R (the distance between the axis of rotation O and the axis B of the pivot connection); r (the distance on the chord of the profiled wing between the axis B and a point P situated essentially at the rear quarter of the profile); a (coefficient of transformation conforming to the profiled wing);

$$A = 2\pi(a_1 - a^2) + S$$
$$B = 2\pi(a_1 + a^2 - S)$$

$$C_1 = 2\pi\left(\frac{a_1 a_2}{a^2} + \frac{a_2 a_3}{a^4}\right) - \pi(A_{-1} - a_1 A_1 - 2a_2 A_2 - 3a_3 A_3 \ldots)$$

where $a_1, a_2 \ldots a_i$ are the terms of the congruent transformation developed in the Laurent series, $A_{-1}, A_1, \ldots A_i$ are the terms of the product of the congruent transformation and its conjugate developed in the Laurentian series and S the surface normal to the profile, measuring and determining at each instant the relative speed V of displacement of the airframe with respect to the fluid, the speed of rotation $\omega$ of the rotor and the volumic mass $\rho$ of the fluid from measurements of the dynamic pressure, the static pressure and the temperature of the fluid, measuring and permanently determining during rotation, the aerodynamic azimuth $\phi$ of each profiled wing for generating a corresponding measurement signal, said aerodynamic azimuth being the angle formed by the direction of the relative wind and the plane M containing the axis of rotation O and the axis B of the pivot connection of the profiled wing considered, generating reference signals representative of the desired forces on the airframe (forces translated by their projections P and T respectively according to a direction perpendicular to the relative wind and according to the direction of the relative wind, said forces P and T being designated by the sequence of lift and drag), determining permanently, for each profiled wing, from the stored parameters, the measured values and the reference signals, the instantaneous geometric angle $\Psi$ defined by the chord of the profiled wing and by the plane M corresponding to $\pm 0.2$ radians close to the following relationships (all angles being defined in the trigonometric sense):

$$\cos\phi_i = C\sin(\phi - \Psi) + \cos\Psi + \frac{r}{R\omega}\left(\omega - \frac{\delta\Psi}{\delta t}\right) \quad (1)$$

$$P = \frac{\eta E}{2}\pi \int_0^{2n} -f\left\{\left[\Gamma - B\left(\omega - \frac{\delta\Psi}{\delta t}\right)\right]m - \right. \quad (2)$$

$$\left. C_i\left(\omega - \frac{\delta\Psi}{\delta t}\right)^2 - A\frac{\delta l}{\delta t}\right\}\sin(\phi - \Psi) \cdot \delta +$$

$$\frac{\eta E}{2\pi}\int_0^{2n} f\left\{\left[\Gamma + A\left(\omega - \frac{\delta\Psi}{\delta t}\right)\right]l + \right.$$

$$\left. C_1\frac{\delta^2\Psi}{\delta t^2} - B\frac{\delta m}{\delta t}\right\}\cos(\phi - \Psi) \cdot \delta\phi$$

$$T = \frac{\eta E}{2\pi}\int_0^{2n} -f\left\{\left[\Gamma - B\left(\omega - \frac{\delta\Psi}{\delta t}\right)\right]m - \right. \quad (3)$$

$$\left. C_1\left(\omega - \frac{\delta\Psi}{\delta t}\right)^2 - A\frac{\delta l}{\delta t}\right\}\cos(\phi - \Psi) \cdot \delta\phi +$$

$$\frac{\eta E}{2\pi}\int_0^{2n} -f\left\{\left[\Gamma + A\left(\omega - \frac{\delta\Psi}{\delta t}\right)\right]l + \right.$$

$$\left. C_1\frac{\delta^2\Psi}{\delta t^2} - B\frac{\delta m}{\delta t}\right\}\sin(\phi - \Psi) \cdot \delta\phi$$

$$0 \leq \phi_{11} \leq \phi_{12} \leq \pi \quad (4)$$
$$\phi_i = \phi_{11} \text{ and } \Gamma = 4\pi a R\omega(\cos\phi_{11}) \text{ if } -\phi_{11} < \phi < \phi_{11} \quad (5)(a)$$
$$\phi_i = \phi \text{ and } \Gamma = 4\pi a R\omega(\cos\phi) \text{ if } \phi_{11} \leq \phi < \phi_{12} \quad (5)(b)$$
$$\phi_i = \phi_{12} \text{ and } \Gamma = 4\pi a R\omega(\cos\phi_{12}) \text{ if } \phi_{12} < \phi < 2\pi - \phi_{12} \quad (5)(c)$$
$$\phi_i = \phi \text{ and } \Gamma = 4\pi a R\omega(\cos\phi) \text{ if } 2\pi - \phi_{12} \leq \phi \leq 2\pi - \phi_{11} \quad (5)(d)$$

$$l = -R\omega[\sin\Psi + C\cos(\phi - \Psi)] \quad (6)$$

$$m = R\omega[\cos\Psi + C\sin(\phi - \Psi)] - \frac{\eta}{2}\left(\omega - \frac{\delta\Psi}{\delta t}\right) \quad (7)$$

and $$C = \frac{V}{\omega R} \quad (8)$$

and controlling the instantaneous geometric angle of each profiled wing at the value of the angle $\Psi$ obtained for said wing.

A model of the non-stationary aerodynamic phenomena has permitted determining a family of rules of incidence corresponding to a maximum energy efficiency, defined by equations (1), (4) and (5). In the process of the invention, the rotational cycle (one turn of the rotor) is divided into four sectors limited by the angles $\Psi_{11}$, $\Psi_{12}$, $2\pi - \Psi_{12}$, $2\pi - \Psi_{11}$, called commutation angles. The two sectors which correspond to the aerodynamic azimuth $\Psi$ comprise between $2\pi - \Psi_{11}$ and $\Psi_{11}$ on the one hand and $\Psi_{12}$ and $2\pi - \Psi_{12}$, are governed with a law of incidence which assures a discharge at constant circulation (which may be different for each of the sectors). These laws are characterized by the constance of the circulation and are translated by differential equation (1) under the corresponding conditions (5 a, c): no energy loss is generated over these sectors by reason of the constance of the circulation. The two other sectors assure the continuity of the circulation between the two sectors with the aforesaid constant circulation. This continuity is assured by differential equation (1) under the corresponding conditions (5 b, d) and authorize the effective passage from one law of incidence to the other. The direction and the intensity of the forces produced are adjusted at each moment by the value which is given to each cycle at each of the commutation angles, according to equations (2), (3), (6) and (7). The integration at each instant of the differential equation (1) under the condition (5) (corresponding to the sector in progress) provides the record of control of the instantaneous geometric angle $\Psi$ of each profiled blade. It is suitable to note that the the assembly of the aforesaid relationships (1) through (8) define the kinematics of a profiled blade, the aerodynamic azimuth $\Psi$ being relative to this profiled blade.

According to a preferred embodiment, the instantaneous geometric angle $\Psi$ is determined by the following operations:

for the assembly of profiled blades:
determining preliminarily from a table of correspondance of values between the parameters $\Psi_{11}$, $\Psi_{12}$, $$\frac{P}{C\omega^2\rho} \text{ and } \frac{T}{\omega^2\rho},$$

this table being determined by carrying out on the parameters $\Psi_{11}$, $\Psi_{12}$ (called commutation angles), the discrete values arranged in a series over the range of variation (4) and calculating for each pair of values ($\Psi_{11}$, $\Psi_{12}$) the values of the solutions $$\frac{P}{C\omega^2\rho} \text{ and } \frac{T}{\omega^2\rho},$$

of the relations (2), (3),
storing said table of correspondance,
calculating permanently the magnitudes $$C = \frac{V}{\omega\rho}, \frac{P}{C\omega^2\rho}, \text{ and } \frac{T}{\omega^2\rho}$$

as a function of the desired forces P and T and the parameters V, $\omega$ and $\rho$ determined,
searching the correspondence table for retrieving the couple $$\frac{P}{C\omega^2\rho}, \frac{T}{\omega^2\rho}$$

closest to the corresponding calculated magnitudes and extracting the values of the corresponding parameters $\Psi_{11}$, $\Psi_{12}$,
for each profiled blade:

resolving the differential equation (1), while giving to the parameters $\Psi_{11}$, $\Psi_{12}$ the values extracted from the table, for obtaining the searched for value of the instantaneous geometric angle $\Psi$ concerning the profiled blade considered.

The determination of the commutation angles from the aerodynamic forces to be generated (P, T) leads to calculations which are very burdensome by reason of the inverse character of the equations (permitting an easy calculation of the forces P and T from a law of incidence of the family, but much more complex in the reverse direction). The correspondence tables mentioned above are established preliminarily by means of a calculator arranging a memory in which are stored the structural parameters of the rotor, while resolving the equations in the direct direction; this permits subsequently, during flight, a rapid determination by quick, conventional calculating means, of the commutation angles $\phi_{11}$, $\phi_{12}$ from the forces P and T (a determination compatible with control in real time). Then, integration of the differential equation over each sector of the cycle is a calculating operation running in real time, which provides the desired geometric angle $\phi$ for controlling the operating mechanism.

To assure the continuity of the real movement of each profiled blade, the real value $\Psi_r$ of the instantaneous geometric angle of each profiled blade comprises:

providing an operating means for the assembly of profiled blades according to a cyclic average law of incidence $\Psi_m = f(\phi)$ by a reversible kinematic able to provide or recover energy according to the load characteristics of the profiled blades, providing a complementary operating mechanism for each profiled blade, from the calculated value of the instantaneous geometric angle $\Psi$, while adjusting at each instant an additional incidence $\Psi_c = \Psi - \Psi_m$ by means of an actuator.

This operating mechanism by totalizing permits minimizing the power to be installed for driving the rotor and the adjusting the incidence of the profiled blades. In effect, at certain moments of the cycle, the profiled blades are generators of power, while at other moments, they require significant power. The reversible kinematic chain common to profiled blades operates a transfer of energy between the different profiled blades, while the actuator of the complementary operating mechanism associated with each profiled blade provides a fine adjustment of the geometric angle $\Psi$ of the blade considered: because of the presence of the reversible kinematic chain, these actuators have less energy to be furnished (lesser dimensions, lesser response time . . . ).

The invention relates to an improved rotor comprising a carrier member adapted to be mounted on the airframe in such a manner as to be able to be driven in rotation about an axis of rotation (O) and at least one profiled blade extending parallel to the axis of rotation (O) and articulated on the carrier member by a pivot connection about axis (B) essentially parallel to the axis of rotation (O); according to the present invention, this rotor comprises, combined with the preceding means:

means for storing specific data of the rotor, means for measuring and determining the relative speed V of the displacement of the cell, of the speed of rotation $\omega$ of the rotor and of the volumic mass of the fluid $\rho$, means for measuring and determining the aerodynamic azimuth $\phi$ of each profiled wing during rotation, means for generating a control signal representative of the desired forces P, T, means for calculating the instantaneous geometric angle $\Psi$ for each profiled blade as a function of the stored parameters, the values determined and the control signals, control means for each profiled blade, adapted to control at each instant the angular position of the blade at the value $\Psi$ calculated and emitted from the calculating means.

According to a preferred embodiment, the control means comprises:

a kinematic chain, common to the assembly of profiled blades and mechanical structure adapted to cause at its output a rotation according to a cyclic law of incidence $\Psi_m$, a hydraulic distributor with a servo-valve, associated with each profiled wing, said distributor receiving a signal representative of the angular variation $\Psi - \Psi_r$, for the profiled blade considered and being adapted to generate a hydraulic power directly related to said angular variation, and a rotary hydraulic actuator associated with each profiled blade and receiving the hydraulic power from the corresponding distributor, said actuator comprising a rotatably movable body driven by the kinematic chain according to the average law $\Psi_m$, an output shaft connected to the profiled blade for achieving the angular position thereof.

Thus, the kinematic chain may for example provide a circular translation of the assembly of profiled blades, in such a manner that the actuator body associated with each profiled blade produces an adjustment with respect to the relative wind, imposed by the cyclic law of incidence. This law is once and for all fixed by the structure of the kinematic chain. The controlling and optimizing of the law of incidence (such as previously defined) are obtained by the intervention of the hydraulic distributor and actuator attached to each blade, which imposes thereon its effective angle of incidence at each instant. The additional angle caused by this hydraulic actuator is adjustable at each instant through the hydraulic distributor. This hydraulic solution permits very high [massique] forces and limits the inertia of the moving parts, thus permitting the rapid accelerations necessary for obtaining the optimum law of steering of the rotor defined above.

Preferably the aforementioned kinematic chain comprises a phase shifter adapted to permit a predetermined adjustment of the origin $\Psi_{mo}$ of the cyclic law of incidence $\Psi_m$ while limiting the maximum amplitude that each actuator must provide. At each cycle, it is, in effect, possible to minimize the peak amplitude of the additional angle $\Psi_c$ which must be provided to each actuator by a controllable [recalage] and appropriate to the angular position of the actuator bodies with respect to the relative wind (the origin of the law $\Psi_m$).

The hydraulic distributor and servo-valve associated with each profiled blade is advantageously connected to at least one hydraulic supply pump and to at least one hydraulic reservoir, arranged in such a manner that said hydraulic reservoir will be filled in case of excess power available on the pump and drained in the opposite case. The power to be provided is reduced considerably, since, for the pumps, only the average maximum power is to be provided (and not the instantaneous maximum power).

The invention also relates to an aircraft comprising at least one rotor such as described above and an integrated motor group at its airframe and coupled with the motor shaft of each rotor.

DESCRIPTION OF THE DRAWINGS

The invention having been described in its general form, the description which follows in reference to the accompanying drawings showing one embodiment and illustrating the steering process. In these drawings which form an integral part of the present description:

FIGS. 7, 9 and 10 are block diagrams illustrating the calculating procedures, while FIG. 8 is a simplified example of the correspondence table initially prepared and stored;

DESCRIPTION OF PREFERRED EMBODIMENTS

Figure 1:
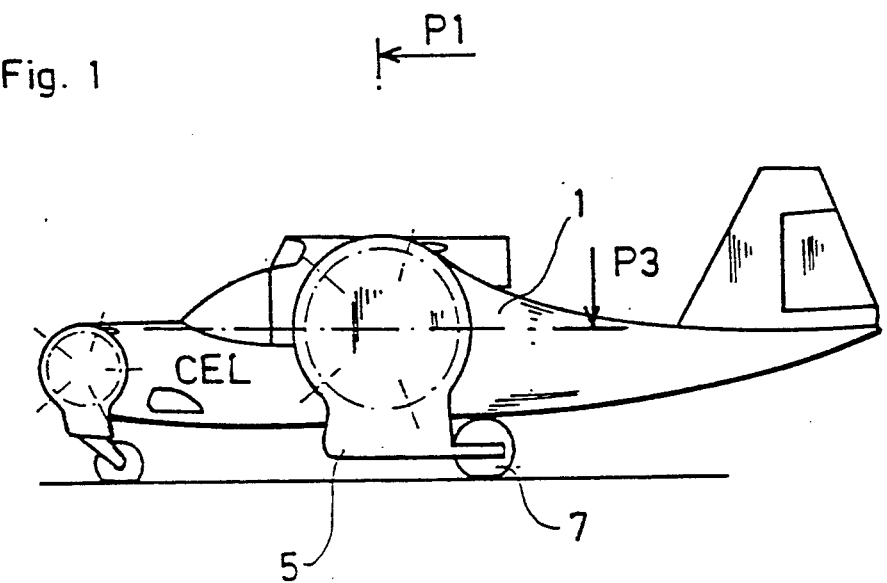
FIG. 1 is a schematic side view of an aircraft according to the invention.
Figure 2:
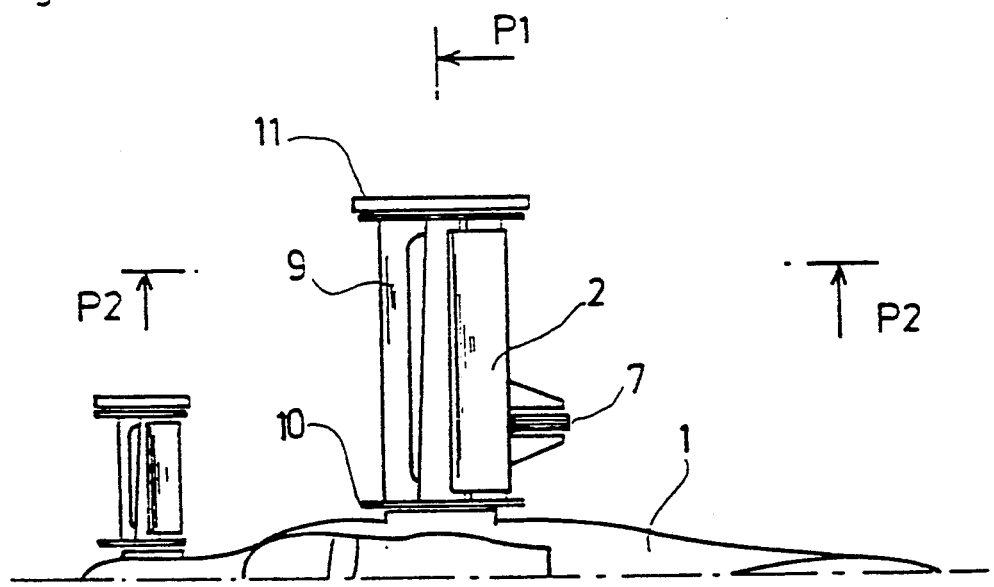
FIG. 2 is a half-section from above.
Figure 3:
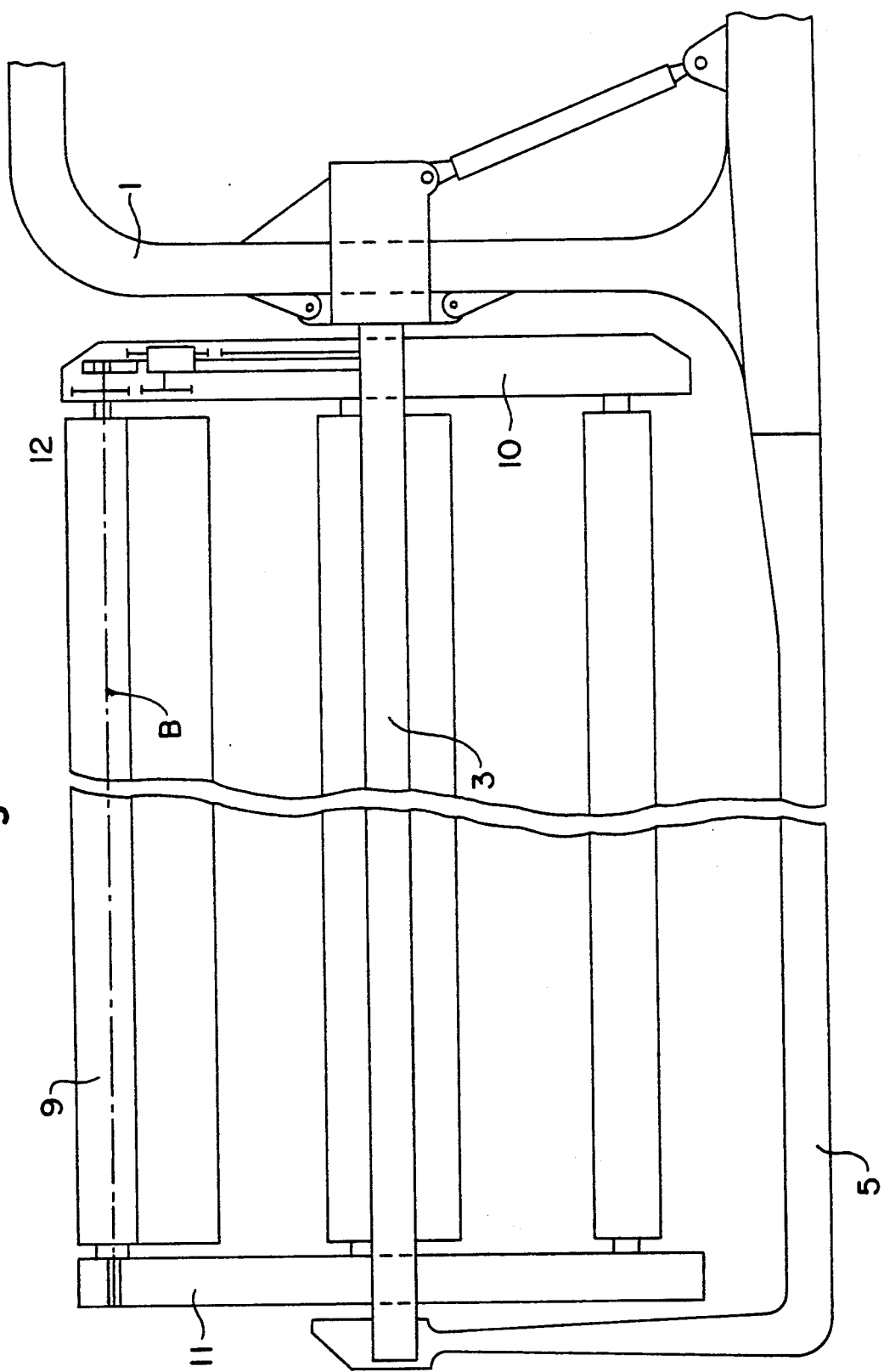
FIG. 3 is a partial and simplified cross-sectional view of a rotor through plane $P_1$.

The aircraft shown by way of example in FIGS. 1 and 2 comprises a airframe 1 of a conventional type, on which are mounted in the example shown four rotors according to the invention, such as 2. The two front rotors of reduced dimensions are intended to permit the control of the aircraft according to the axis of pitch and play the role of the horizontal rear ailerons of conventional airplanes. These rotors are steered according to a law of incidence giving giving purely sustaining forces with respect to the relative wind (T=0 P>0). They are structurally identical to the primary rear rotors intended to develop sustaining forces and/or propulsion forces as a function of the directions from the pilot. The laws of incidence of the two primary rotors are identical in rectilinear flight and symmetrical conditions and will be differentiated by the commands in the goal of obtaining desired movements of looping and rolling.

Each rotor 2 comprises a longitudinal rotating shaft 3 (the term "longitudinal" referring to the direction of the rotor) which is carried on one side by a hub 4 connected to the airframe 1 and which is supported on the other side by a fixed profiled member 5 provided with a bearing, this member extending back and attached to the airframe 1. In the example, the profiled member 5 is provided with a wheel 7.

Figure 4:
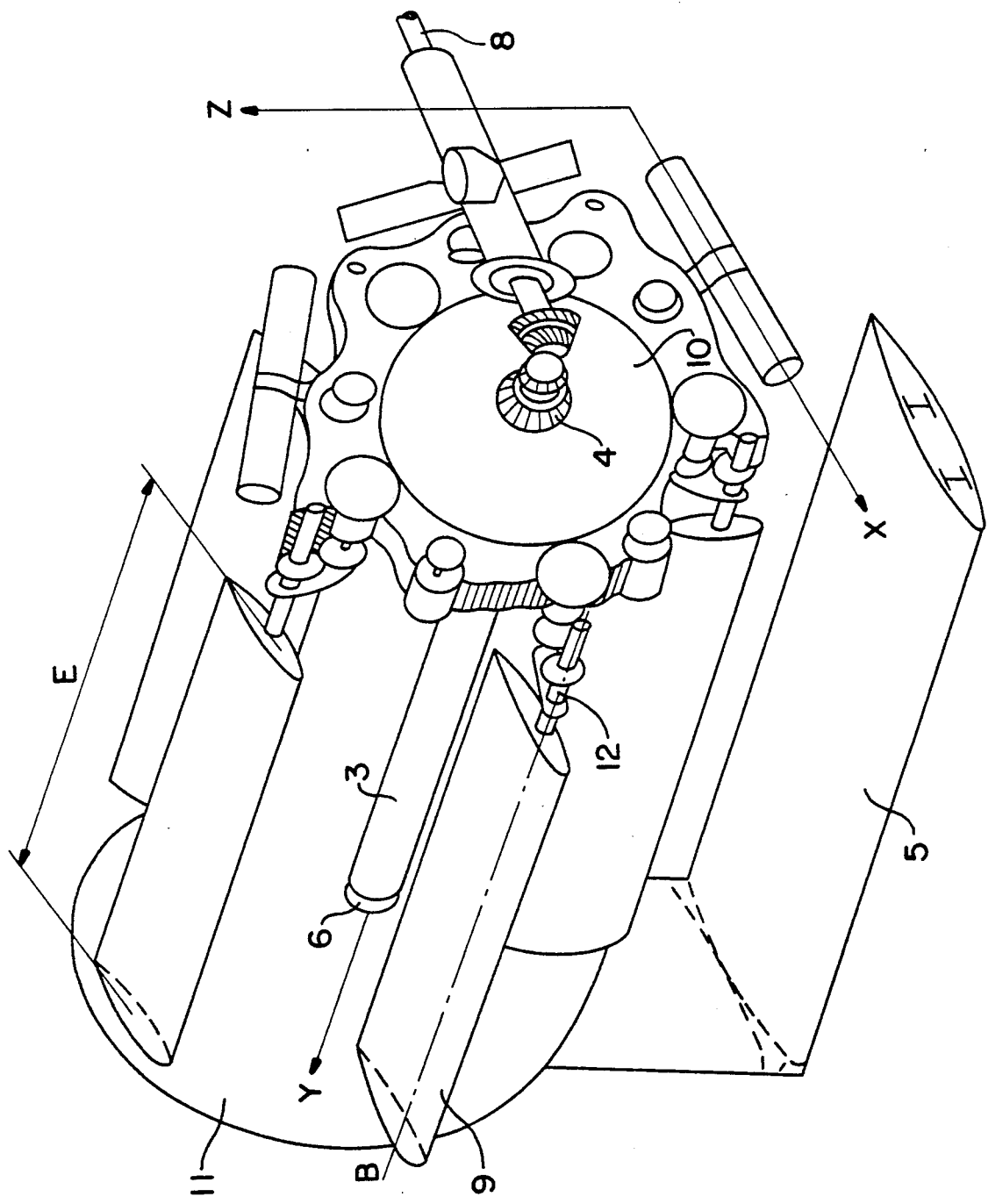
FIG. 4 is a perspective schematic view with parts broken away.

The airframe encloses a motor group which is common the the assembly of the rotors and of which the output shaft 8 may be seen in FIG. 4. This shaft 8 is coupled to the shaft 3 of each rotor by a mechanical transmission, assuring the rotational driving of the rotor considered at a speed $\omega$.

Each rotor comprises five profiled blades such as 9, angularly distributed by 72° about the central shaft 3. The longitudinal spread of each profiled blade is designated by -E-.

The profiled blades 9 are carried by a carrier member comprising two flanges 10 and 11 on which they are articulated by axles such as 12, comprising a pivot connection of the axis B. The end of the axle 12 situated on the side of the airframe is driven in rotation as will be seen below for imposing a predetermined incidence to the profiled blade, while the other axle serves only as a bearing.

Figure 5:
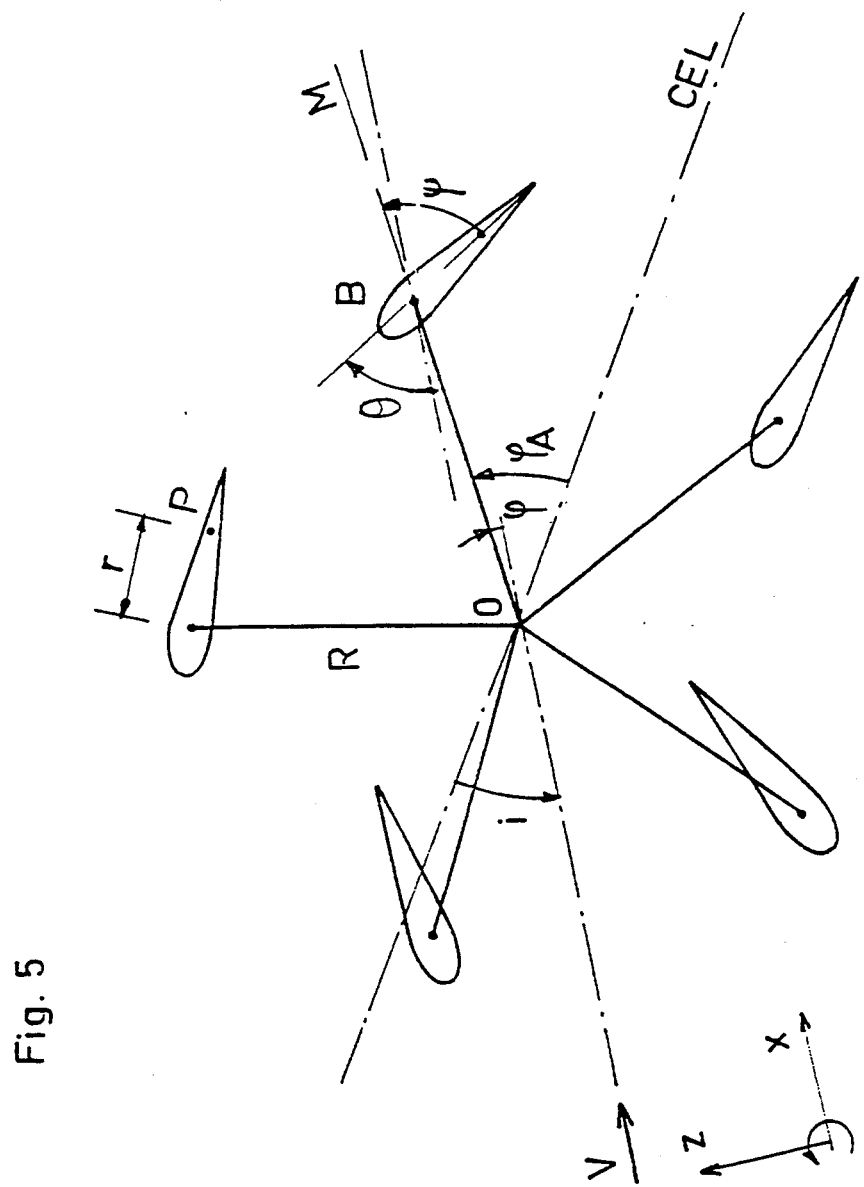
FIG. 5 is a transverse schematic cross-sectional view of the rotor through a plane $P_2$.

Shown in FIG. 5 is a cross-section of the rotor through a plane $P_2$ perpendicular to its axis. The profiled blades 9 are in the example symmetrical biconvex profiles, especially of the "KARMAN-TREFITZ" type, but may be of a different type following the desired performances. The internal rib structure of each profiled blade is of a conventional type, with caissons or otherwise.

The profiled blade is articulated about its axles 12 essentially in the quadrant ahead of its chord; this point constitutes approximately the center of the profile and it is with respect thereto that the aerodynamic forces generate the weakest average torque on the wing.

FIG. 5 shows for one of the profiled blades the various characteristic parameters of this blade and of its position at any given moment:

R: the distance between the axis of rotation O (axis of the shaft of the rotor 3) and the axis B of the pivot connection;

r: the distance between the axis B of the pivot connection and the point P situated essentially a fourth to the rear of the profile;

the instantaneous geometric angle $\Psi$ defined by the chord of the profiled blade and a plane M containing the axis of rotation O and the axis B of the pivot connection;

the angular azimuth $\phi$ formed by a reference plane connected to the cell, for example the axis -Cel- of the airframe and by the plane M;

the aerodynamic azimuth $\phi$ formed by the direction of the relative wind V (in fact by the projection of the relative wind on a transverse plane perpendicular to the plane M) and by the plane M;

the angle of incidence of the profiled wing $\theta = \phi - \Psi$;

the angle of incidence of the airframe $i = \phi_A - \phi$.

The means described hereinafter with reference to FIGS. 6 to 13 permit adjustment for each profiled blade 9 of the instantaneous geometric angle $\Psi$ of this blade in such a manner as to obtain the desired forces P and T provided by the rotor considered on the cell, these forces being functions of the external conditions encountered and of the flight conditions desired for the aircraft. This means is adapted to define the angle $\Psi$ of each blade by the application of the relationships (1) and (8) already furnished.

The algebraic magnitudes P and T are the projections of the aerodynamic force to be created by the rotor on the airframe under the action of the fluid, respectively according to a direction perpendicular to the relative wind (lift) and in the direction of the relative wind (drag).

Figure 6:
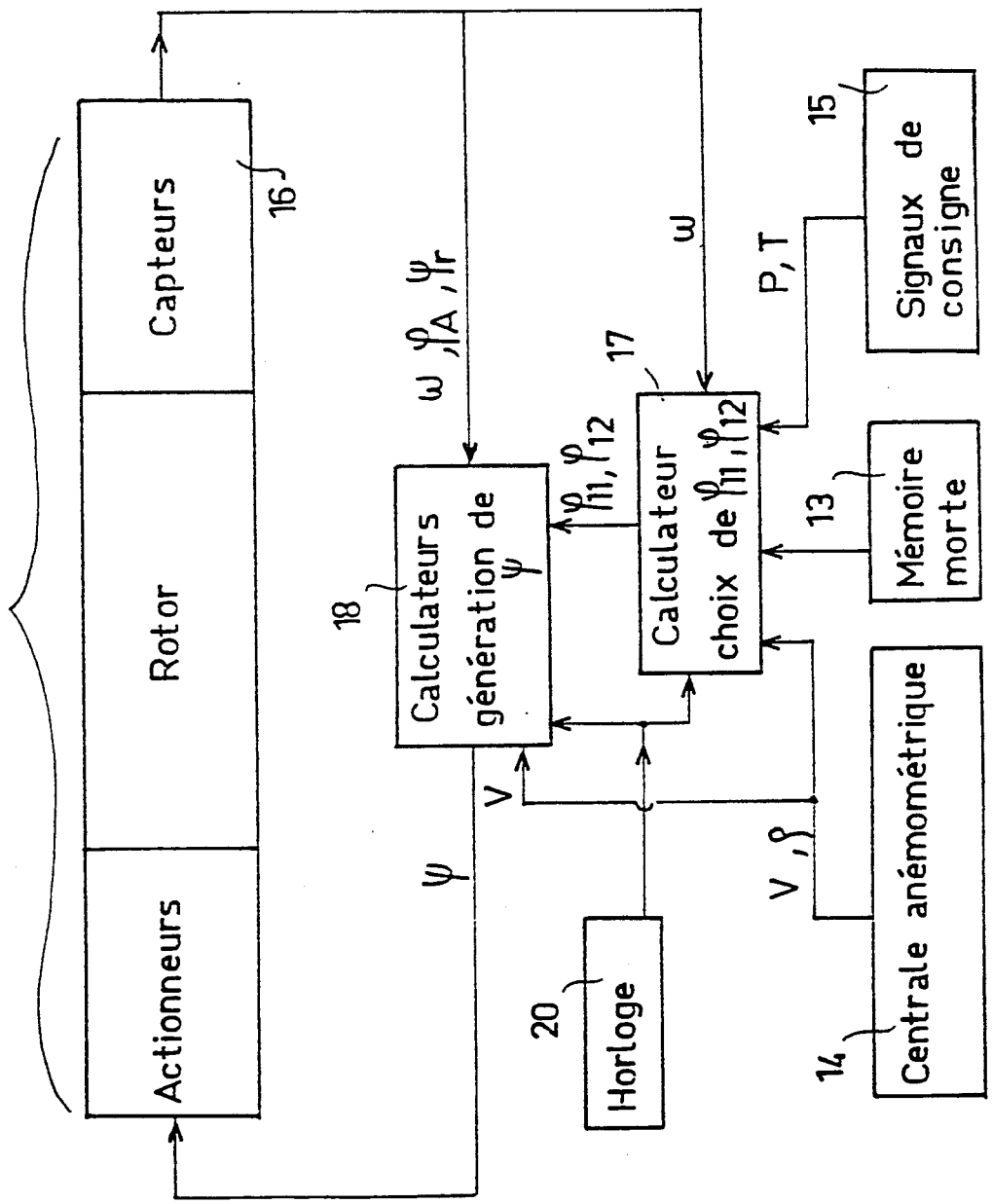
FIG. 6 is an block diagram showing the steering process.
Figure 7:
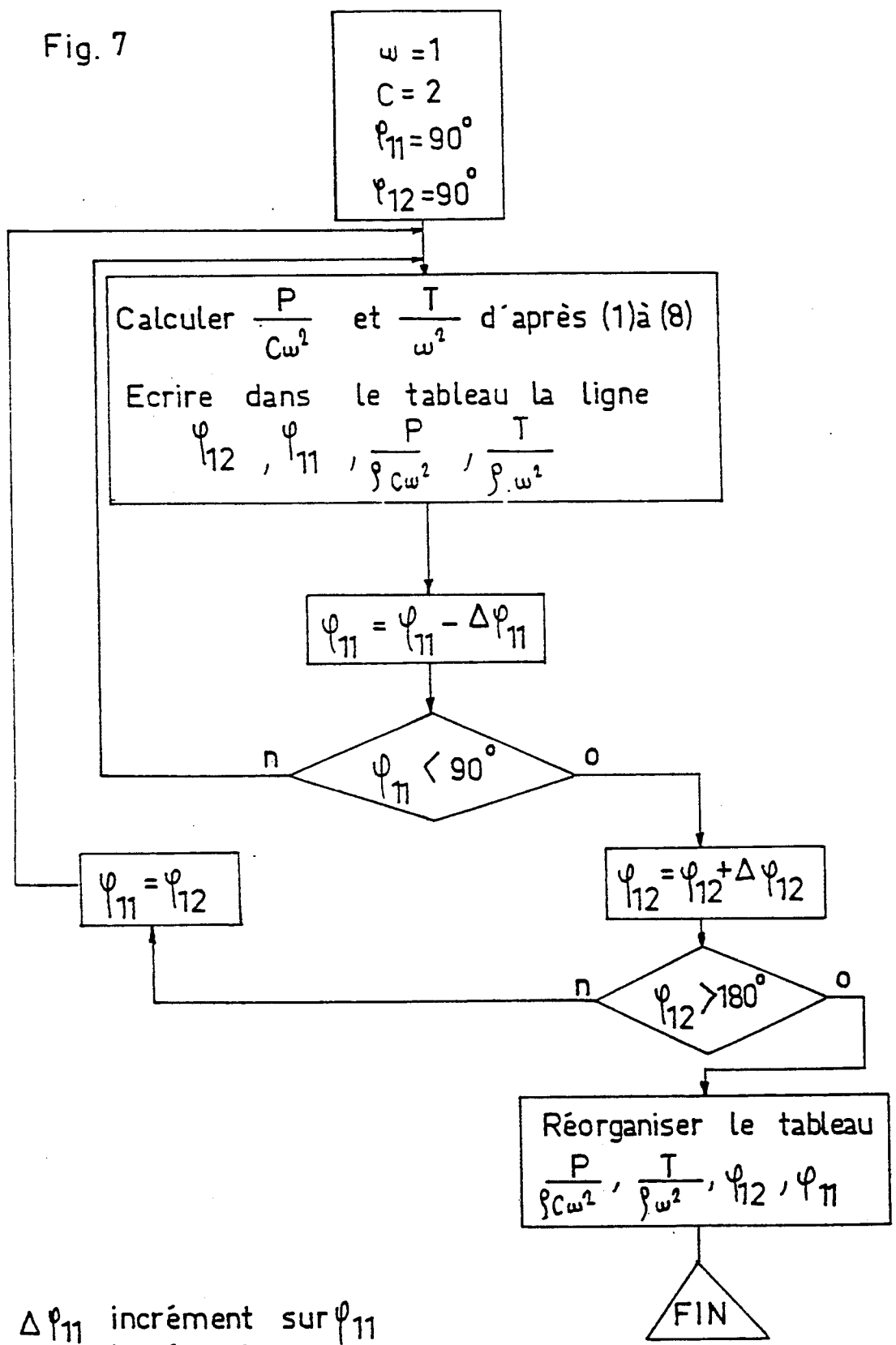

FIG. 6 shows the functional diagram of control of the rotor, which comprises:

data storage means specific for the rotor, comprised of a read only memory 13 in which is initially stored a table of correspondence of the values between the angles of commutation $\phi_{11}$, $\phi_{12}$ and the magnitudes $$\frac{P}{C\omega^2\rho} \text{ and } \frac{T}{\omega^2\rho},$$

means for measuring and determining the relative speed V of displacement of the airframe and of the volumic mass of fluid $\rho$, constituted by an anemometric station 14, means for generating control signals representative of the desired forces P, T, constituted by a conventional system of aeronautical steering 15 (center of inertia, automatic pilot, flight control and associated electronics).

The table of correspondence is obtained in a preliminary phase of calculation by means of a non-airborn calculator, providing a memory in which the following structural parameters are entered:

nE: equivalent span, equal to the product of the number n of profiled blades (five for the rotor described in the example) per their span E;

R: the distance on the chord of the profiled blade between the axis B and the point P situated essentially a fourth to the rear of the profile (in the example r is essentially equal to half of the length of the chord);

a: the coefficient of congruent transformation applied to the profile of the blade (conventional data of the profile concerned, in the example of the KARMAN-TREFTZ profile chosen of a relative thickness of 17%: a=0.2269);

$A = 2\pi(a_1 - a^2) + S$, in the example equal to $-1.258 \times 10^{-2} m^2$, $B = 2\pi(a_1 + a^2 - S)$, in the example equal to $4.891 \times 10^{-1} m^2$, $C_1 = 2\pi \left( \frac{a_1 a_2}{a^2} + \frac{a_2 a_3}{a^4} \right) -$ $\pi(A_{-1} - a_1 A_1 - 2a_2 A_2 - 3a_3 A_3 \ldots)$ (in the example, $C_1 = 6.233 \times 10^{-3} m^3$), where $a_1, a_2 \ldots a_i$ are terms of the congruent transformation developed by the Laurent series, $A_{-1}, A_1, \ldots A_i$ the terms of the product of the congruent transformation and of its conjugate developed in the Laurent series and S the normal surface of the profile.

A set of sensors 16 measures at each instant the real parameters of the configuration of the rotor ($\phi_A$: angular azimuth of a profiled blade of reference, $\Psi_r$: instantaneous real geometric angle which characterizes at each instant, each profiled blade).

Further, the system is provided with calculating means comprising a first calculator 17 called upon to determinate at each instant the commutation angles $\phi_{11}$, $\phi_{12}$, and common to the assembly of profiled blades, and a second calculator 18 associated with each profiled blade in order to calculate the instantaneous geometric angle $\Psi$ of said profiled blade.

For this, the read only memory 13 stored a table or correspondence of the values between the angles of commutation $\phi_{11}$, $\phi_{12}$ and the magnitudes $$\frac{P}{C\omega^2\rho} \text{ and } \frac{T}{\omega^2\rho}.$$

A simplified example of said table is provided in FIG. 8 for the rotor and the KARMAN-TREFITZ profile considered.

This table is defined in the preliminary step of the aforementioned calculations by means of the non-airborn calculator, by giving to the angles $\phi_{11}$ and $\phi_{12}$ discrete values, in the example with a step of 10 degrees between 90° and 180°, and by calculating for each by calculating for each pair of values $\phi_{11}$, $\phi_{12}$ the values of the magnitudes $$\frac{P}{C\omega^2\rho} \text{ and } \frac{T}{\omega^2\rho}.$$

by means of the relations (2) and (3). It should be noted that $90° \leq \phi_{11} < \phi_{12} \leq 180°$ corresponds to forces of positive lift (lifting force) and negative drag (propulsion). The logic diagram for the calculation of this table is provided in FIG. 7.

The table of correspondence may thus be stored in the memory 13 in the form of a four column matrix corresponding to the values of $$\frac{P}{C\omega^2\rho}, \frac{T}{\omega^2\rho}, \phi_{11}, \phi_{12}.$$

The calculator 17 receives the parameters V, $\rho$, $\omega$, P and T from the center 14, the sensors 16 and the generating means 15. It calculates permanently the magnitudes $$\frac{P}{C\omega^2\rho} \text{ and } \frac{T}{\omega^2\rho}.$$

The constant $C = V/\omega R$ is determined from the values of V, $\omega$ received by the calculator and the numerical value R, the constant integrated to the computer of the calculator 17. This then explores the table of correspondence stored in the memory 13 while reading the two columns $$\frac{P}{C\omega^2\rho}, \frac{T}{\omega^2\rho}$$

for identifying closest pair of calculated values and extracting the corresponding values $\phi_{11}$, $\phi_{12}$ in the two other columns. All the magnitudes thus indicated are common to the set of profiled blades, such that the calculator 17 is unique.

By contrast, a calculator 18 is associated with each profiled blade. If arranges in its program the numerical values r and R and receives at each instant:

the angles of commutation $\phi_{11}$, and $\phi_{12}$ issued by the calculator 17, the angular azimuth $\phi_A$ and the instantaneous real geometric angle $\Psi_r$, issued from the sensors 16 (attached azimuth and angle of the profiled blade considered), the relative speed V from the center 14, the speed of rotation $\omega$ issued from the sensors 16.

From these values, the calculator 18 resolves for each profiled blade the differential equation (1) for calculating the value sought of the instantaneous geometric angle $\Psi$.

The resolution of this differential equation is carried out at each instant by a calculation having the following steps: comparing the measured value $\phi$ to the angles of commutation $\phi_{11}$, $\phi_{12}$ for determining the value of $\phi_i$ by the relations (5), using the value of $\phi_i$ and the measured parameters, calculated or stored, C, $\omega$, r, R, for resolving said differential equation by a RUNGE-KUTTA method.

The real value $\Psi_r$ of the geometric angle of each profiled blade, which is measured by one of the sensors 16, is introduced at each instant into the calculator 18 for serving as the integration constant.

Figure 9:
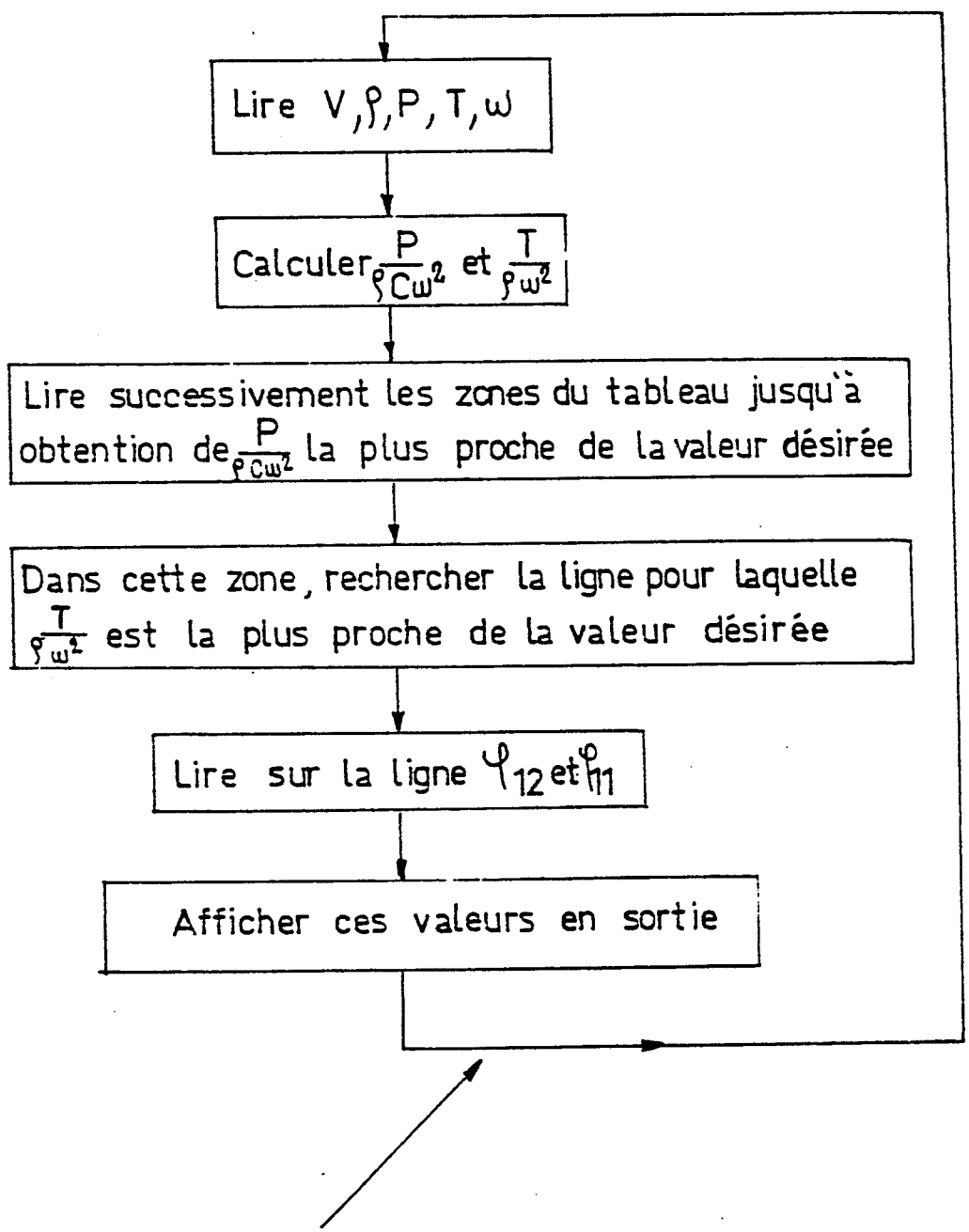
Figure 10:
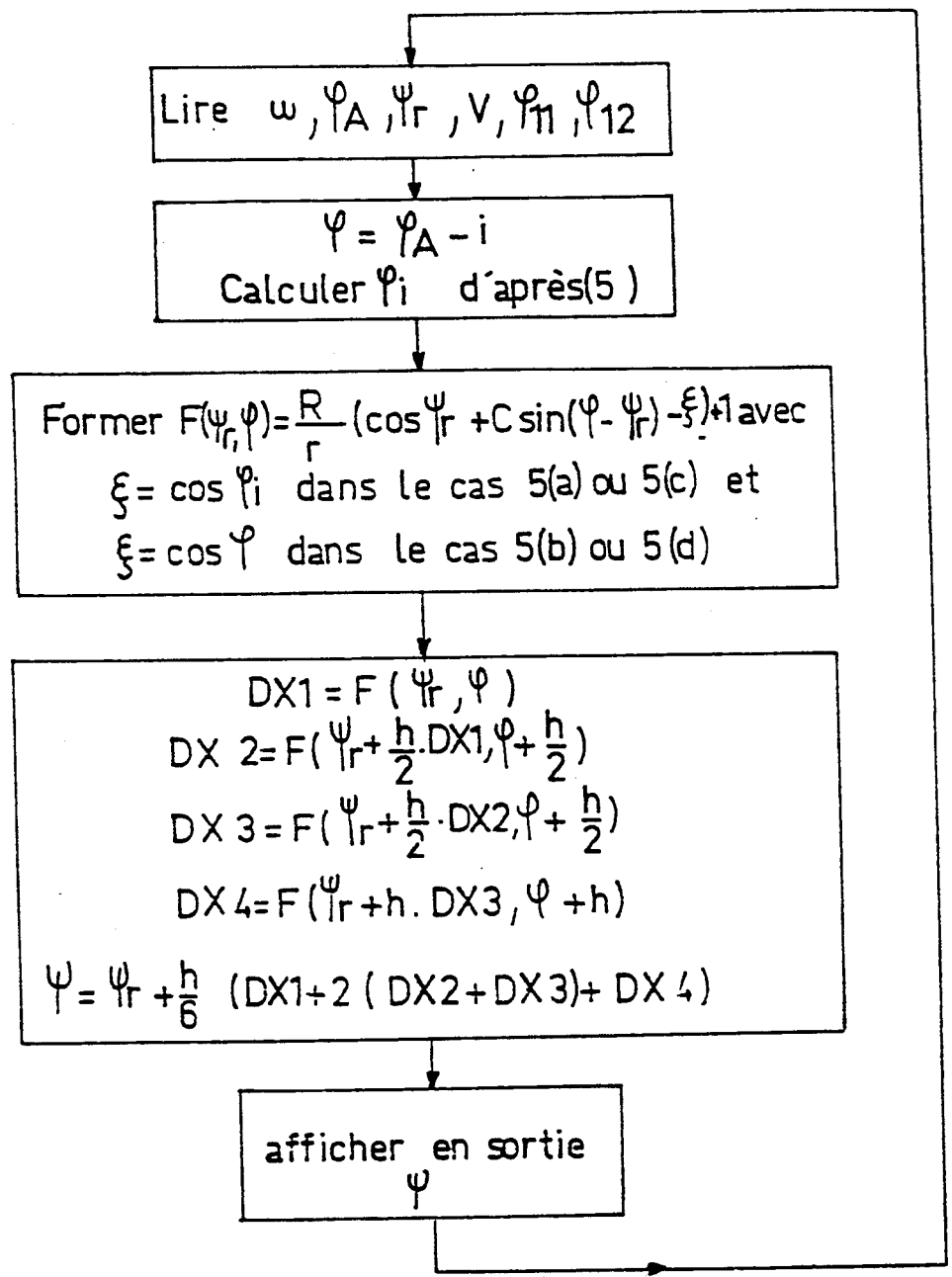

The logic diagrams of FIGS. 8 and 9 illustrate the algorithms of calculation, carried out respectively in the calculators 17 and 18.

The program is executed in a sequential manner due to the clock signals generated by a clock 20 of a high frequency with respect to the number of rotations per second of the rotor (2,000 hertz for example for speeds of rotation of the rotor on the order of 5 turns per second). At each clock pulse, the calculators 17 and 18 read the operating and measured signals, then the calculations are carried out in the time t separating two clock pulses for determining the new value of the instantaneous geometric angle $\Psi$ called upon to serve as the operating instruction for the operating mechanism.

The angular integration step h is equal to $t\omega$ which represents the increase in the angular azimuth $\phi_A$ between two clock pulses.

Figure 11:
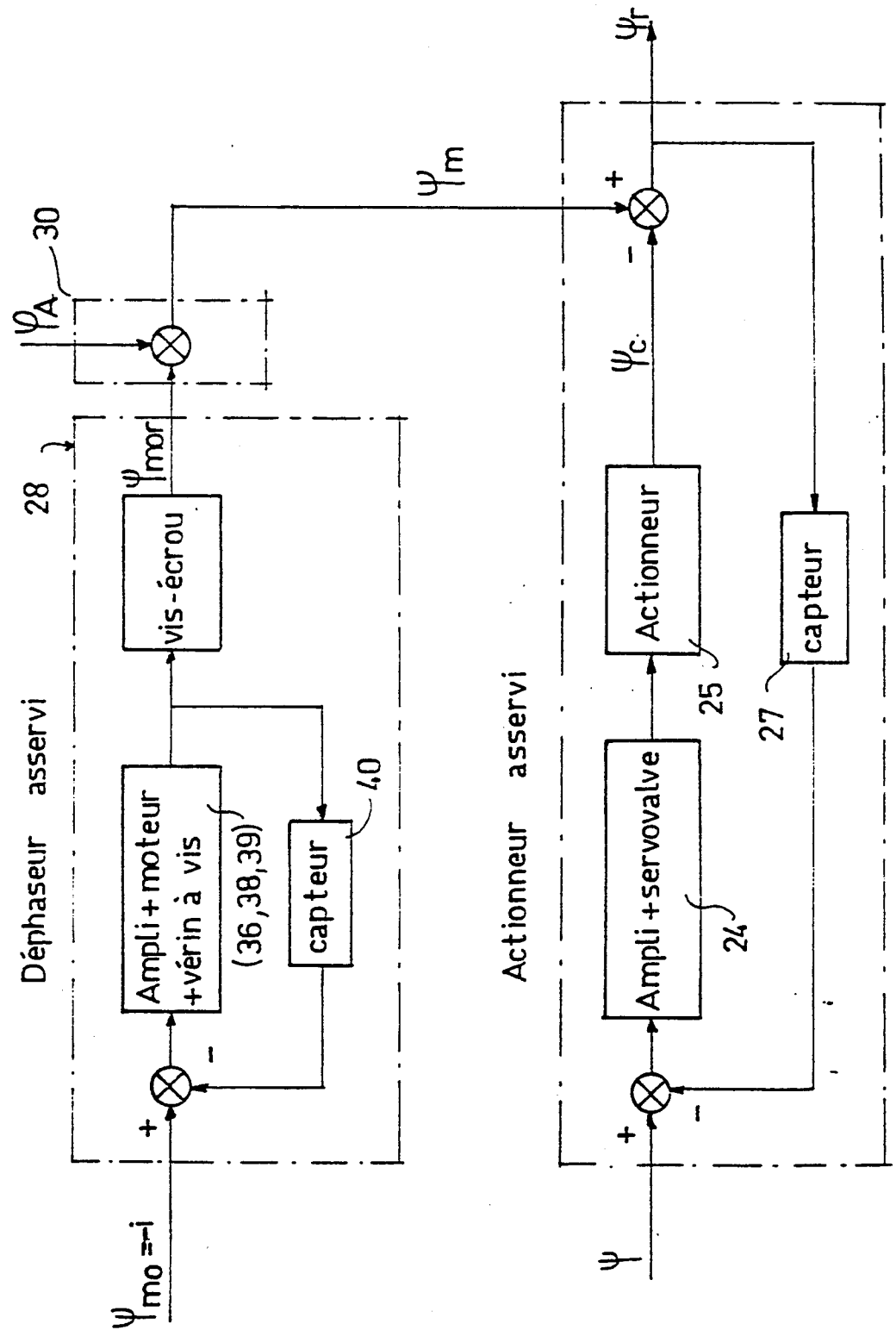
FIG. 11 is an operating diagram of the control loop.

FIG. 11 is a functional diagram of the closed operating mechanism cycle associated with each profiled blade of the rotor, which from the instantaneous geometric angle $\Psi$ issued by the calculator 18 and the information of the relative speed V, controls the angular position of the profiled blades in such a manner as to reduce at each instant the variation between the instantaneous geometric angle $\Psi$ calculated and the real instantaneous geometric angle $\Psi_r$.

In this manner, the real movement of each profiled blade (angular position $\Psi_r$) is obtained by addition of an average movement (average cyclic angle of incidence $\Psi_m$) and a complementary movement (additional angle of incidence $\Psi_c$).

The average movement is assured by a kinematic chain 22 common to the set of profiled blades, of which the timing of the origin $\Psi_{mo}$ is assured by a controlled phase shifter 28. In the example, the law of average cyclic incidence is chosen to correspond to a circular translation of the profiled blade, this law being then of the form: $\Psi_m = +\phi_A + \Psi_{mo}$. The angle $\phi_A$ is the aerodynamic azimuth of each profiled blade and is determined by means of a sensor 30 fixed on the flange 10 (opposite the fixed ring 42 described below). In the example described, the angle $\Psi_{mo}$ is chosen to be equal to $-i$ such that the peak amplitude of the additional angle of incidence $\Psi_c$ is less on each rotation. This permits the use of the actuators 25 with an amplitude of movement relatively reduced.

It should be noted that the sensor 30, comprised particularly of a phonic wheel, also delivers a signal representative of the speed of rotation $\omega$.

The complementary movement is assured by hydraulic means 23 associated with each profiled blade and comprising a hydraulic actuator 25 controlled with the magnitude of the control $\Psi$.

The operating mechanism of the hydraulic actuator 25 to the magnitude of the control $\Psi$ is provided in a closed cycle in a manner as to reduce at each instant the angular deviation $\Psi - \Psi_r$ where $\Psi_r$ is the real value of the angle $\Psi$. This value $\Psi_r$ is furnished by a sensor 27 associated with each profiled blade. In the example, as will be seen below, the sensors 27 are phonic wheel sensors mounted on the flange 10.

Figure 12:
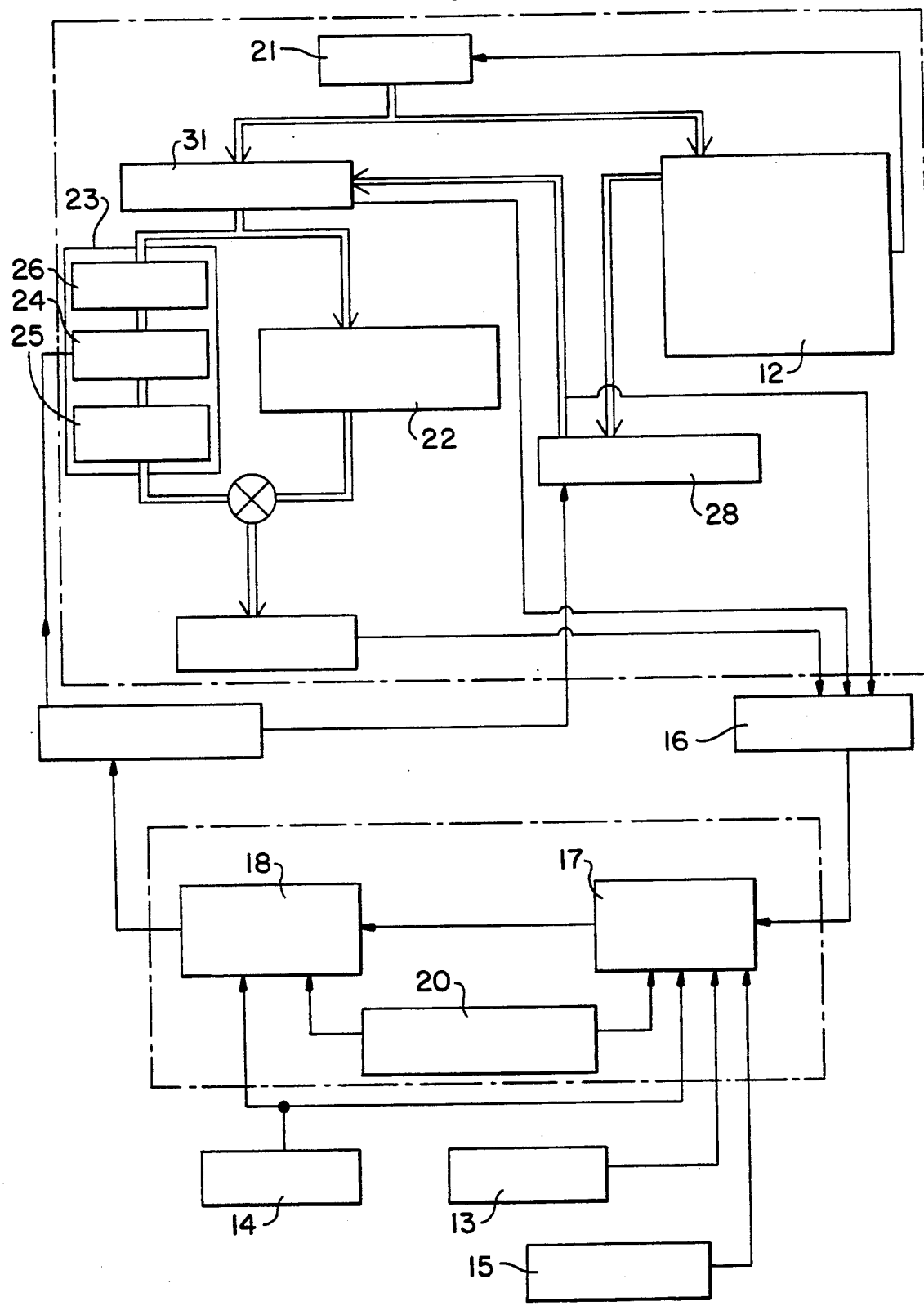
FIG. 12 is a block diagram of the power train and operating mechanism of the rotor.

FIG. 12 is a block diagram of the power train and operating mechanism of the rotor. Shown in heavy lines in this figure are the transfers of power in the kinematic chain 22 and the hydraulic means 23, and in finer lines, the transfers of signals and power in the powered accessories, the sensors and the calculating means. (In 50 is shown the electrical generation of the conventional type.)

The motor group shown at 21 provides the power:

in a mechanical form through the rotation of the rotor, to the kinematic chain 22 which is reversible and common the set of profiled blades and the mechanical structure of which (detailed below) is adapted to generate a rotational output according to the average cyclic law of incidence $\Psi_m$, always through the rotation of the rotor, to hydraulic means 23 comprising hydraulic feed pumps 26, a hydraulic distributor with a servo valve 24 associated with each profiled blade and fed by the pumps 26, and the rotary hydraulic actuator 25, which is associated with each profiled blade and which receives the power from the distributor 24, the hydraulic structure of this means (detailed below) being adapted to generate the aforementioned complementary movement $\Psi_c$.

A current representative of the angular deviation $\Psi - \Psi_r$ is delivered to the hydraulic distributor 24 for the blade considered and this modulates the hydraulic power received from the pumps 26 for generating toward the corresponding actuator 25 a hydraulic power directly connected to the value of said deviation, that is, a flow as a direct function of said deviation, in the example of an actuator constituted by a rotary screw.

Each actuator 25 comprises a body 25a movable rotationally driven by the kinematic chain 22 according to the average law $\Psi_m$, an output shaft 25b coupled to the profiled blade considered for securing its angular position.

Thus, as the relative angular position of the shaft 25b with respect to the body 25a is defined for the angle $\Psi_c$, one achieves at the level of the profiled blade the summation of the angles: $\Psi_r = \Psi_m + \Psi_c$.

Figure 13:
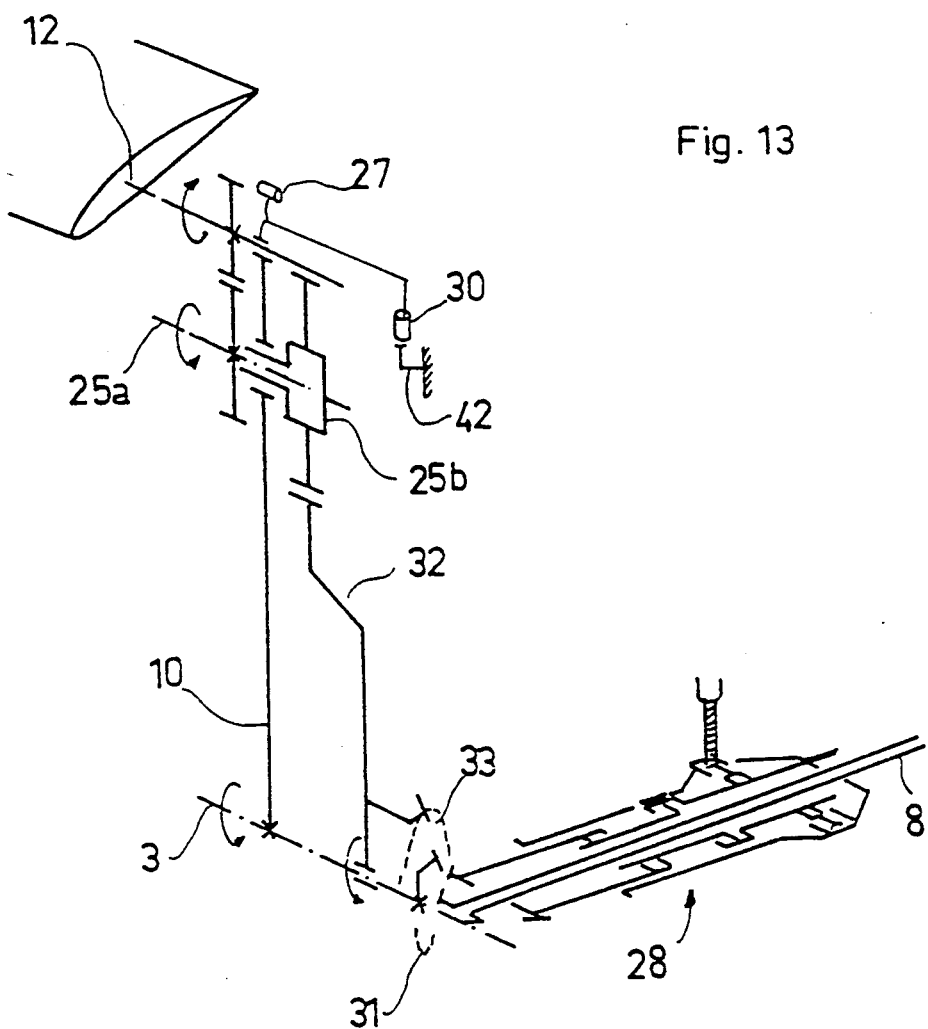
FIG. 13 is a general mechanical schematic view of the reversible kinematic chain assuring the average law $\Psi_m$.
Figure 14:
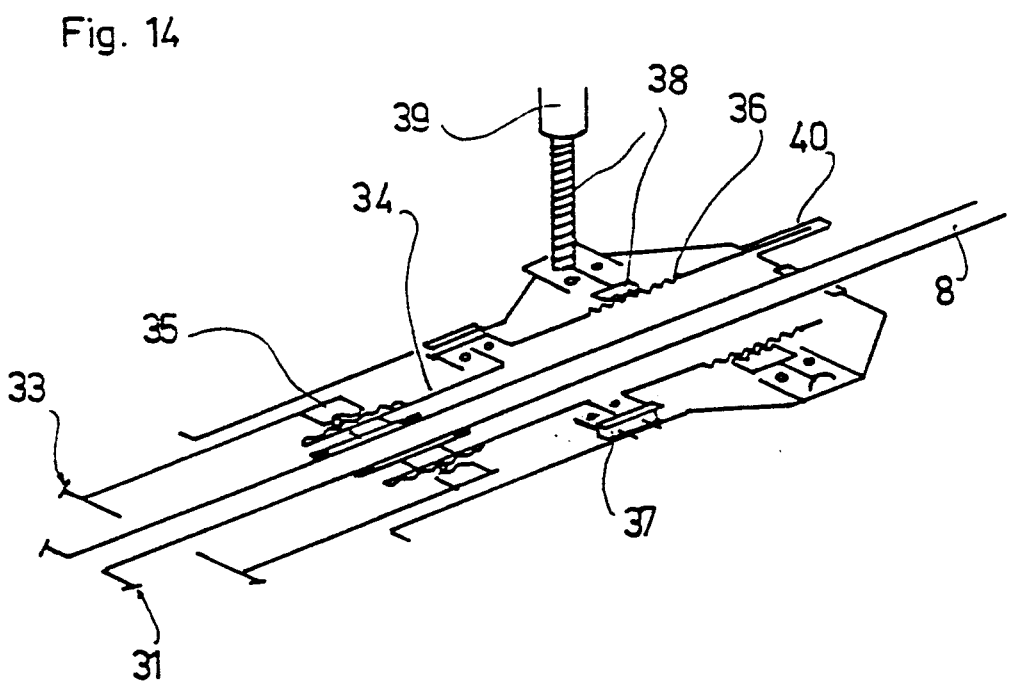
FIG. 14 is a detailed schematic of phase shifter of this chain.
Figure 15:
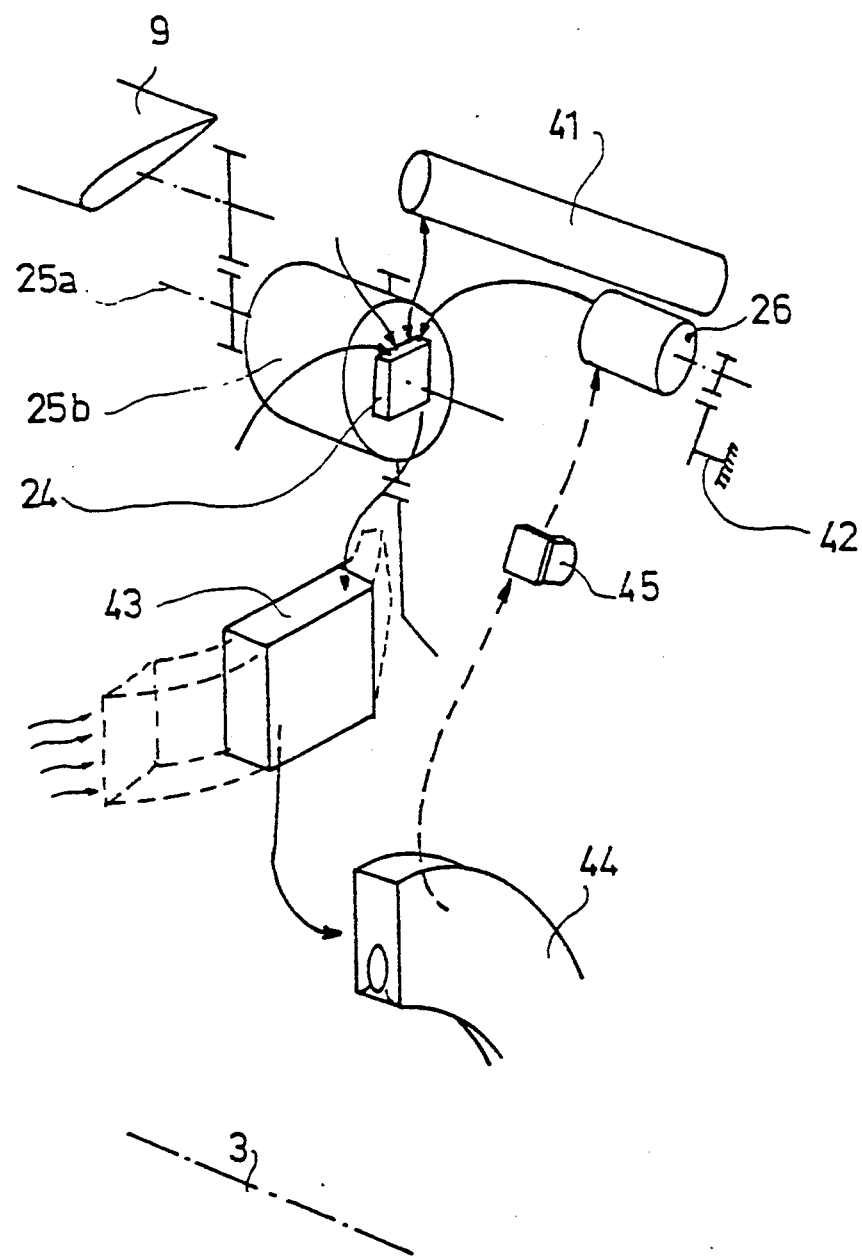
FIG. 15 is a schematic view of the implementation of hydraulic power means.

FIG. 13 shows the general mechanical schematic of the kinematic chain 22, FIG. 14 the detailed schematic of the phase shifter 28 of this chain and FIG. 15 the schematic for the implementation of the hydraulic means.

In the example, the kinematic chain 22 comprises essentially:

a motor shaft 8 arranged to receive a motive driving power from the rotor, a rotor shaft 3 arranged on the axis of rotation of the rotor and coupled by a first transmission 31 to the motor shaft 8 for rotationally driving the rotor, a toothed wheel 32 centered on the shaft of the rotor 3 and coupled by a second transmission 33 to the phase shifter 28, said toothed wheel driving the body 25a of the rotary actuator associated with each profiled blade, a flange 10 of the supporting structure, connected to the shaft of the rotor 3 and supporting the bodies 25a of the actuators and the axles 12 carrying the profiled blades, the phase shifter 28, of a mechanical nature, arranged to assure a relative angular shifting $\Psi_{mo}$ between the first transmission 31 and the second transmission 33.

Thus, the phase shifter acts in a collective manner on the adjustment of the set of profiled blades, while, through the intermediary of the flange 10 and the toothed wheel 32, the kinematic chain operates a transfer of mechanical power from the motive profiled blades toward the receiving profiled blades. This arrangement permits a compact arrangement and is adapted to loads carried.

Further, the mechanical phase shifter 28 illustrated by way of example in FIG. 14 comprises essentially:

a reversible bead screw 34 carried by the motor shaft 8 for turning therewith and movable in translation along this motor shaft, a screw nut 35 for the bead screw connected to the second transmission 33 and cooperating with said bead screw 34 in such a manner as to generate a rotation of said screw nut connected to the translation of the bead screw, a screw jack 36 connected, through the interconnection of ball stops 37, to the bead screw 35 in order to be able to move it along the motor shaft, an endless screw 38 coupled to the screw jack 36 for actuating it, this endless screw being provided with a phase shifting control motor 39.

The phase shifter control motor 39 is an electric motor which controls the angular position of the phase shifter as a function of the angle $\Psi_{mo}$ adjustment issued from the calculating means 29 and of the real angle $\Psi_{mor}$ determined from the measurement of a sensor 40 mounted on the phase shifter. The motor controls the angular position of the phase shifter, by reducing at each instant the angular deviation $\Psi_{mo} - \Psi_{mor}$.

As shown in FIG. 15, the hydraulic distributor with the servovalve 24 which is associated with each profiled blade is connected in the example to two hydraulic feed pumps 26 of the variable cylinder type regulated at constant pressure Each pump is associated with a hydraulic accumulator 41, in such a manner that said accumulator is loaded in case of excess power available on the pump and restored in the opposite case.

The pumps, five in number, arranged to feed each two adjacent distributors, are supported by the flange 10 in order to rotate therewith and are mechanically coupled to a fixed toothed ring 42 connected to the airframe 1 in order to rotationally drive each of said pumps.

This hydraulic system is also arranged in a conventional manner with heat exchangers 43, compact, fixed on the flange 10, a pressurized toroidal chamber 44 as well as an oil filter 45. Such an architecture furnished a hydraulic system able to operate at the speeds of rotation of the rotor. For reasons of reliability, each distributor 24 is comprised of two redundant distribution members, each modulating the power furnished by the hydraulic generation with which it is associated. The arrangement of the pumps about the flange 10 permits a driving thereof at speeds required (on the order of 3,500 rpm) from the much slower rotation of the rotor.

Figure 16:
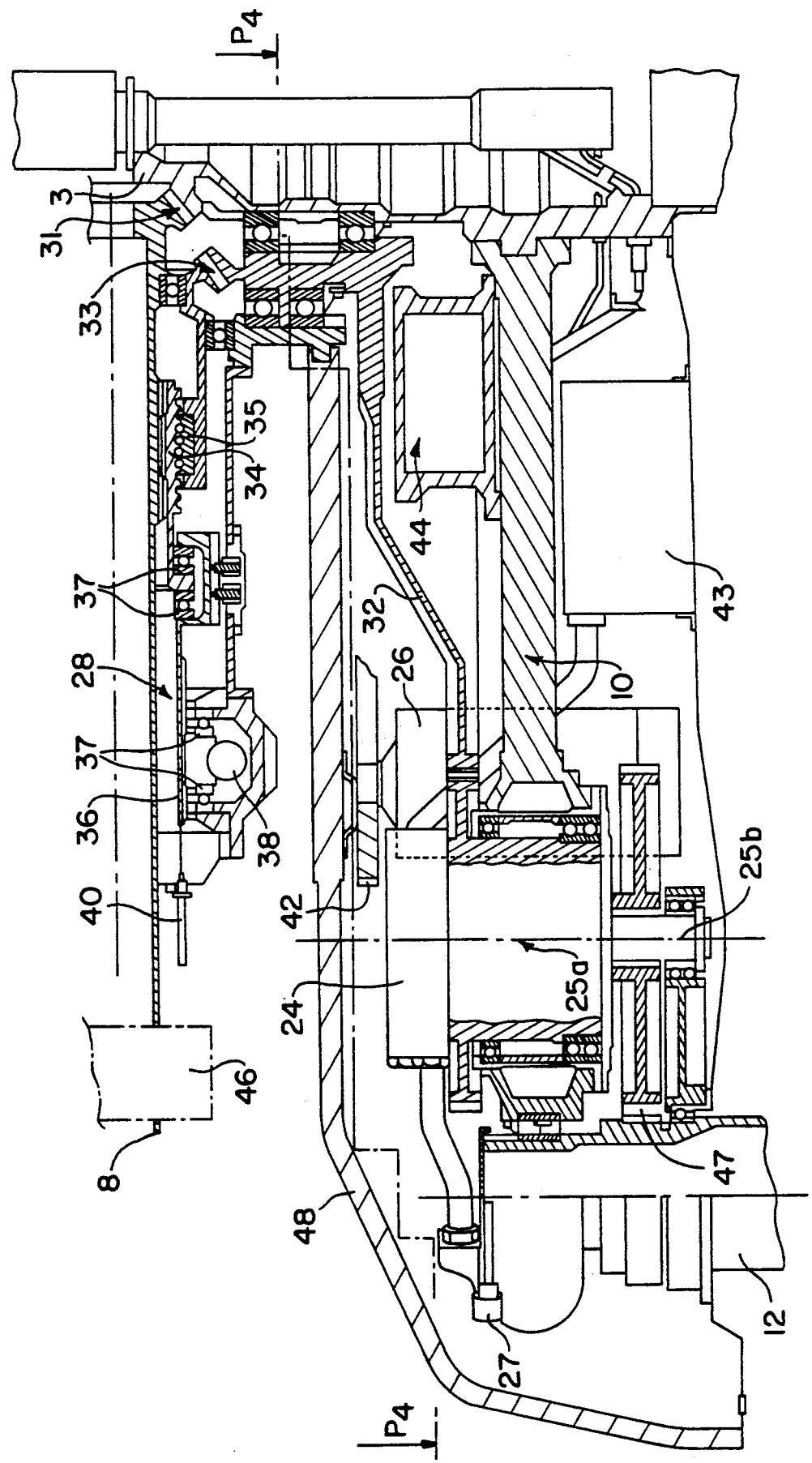
FIG. 16 is a partial longitudinal cross-section of the rotor through a plane $P_3$.
Figure 17:
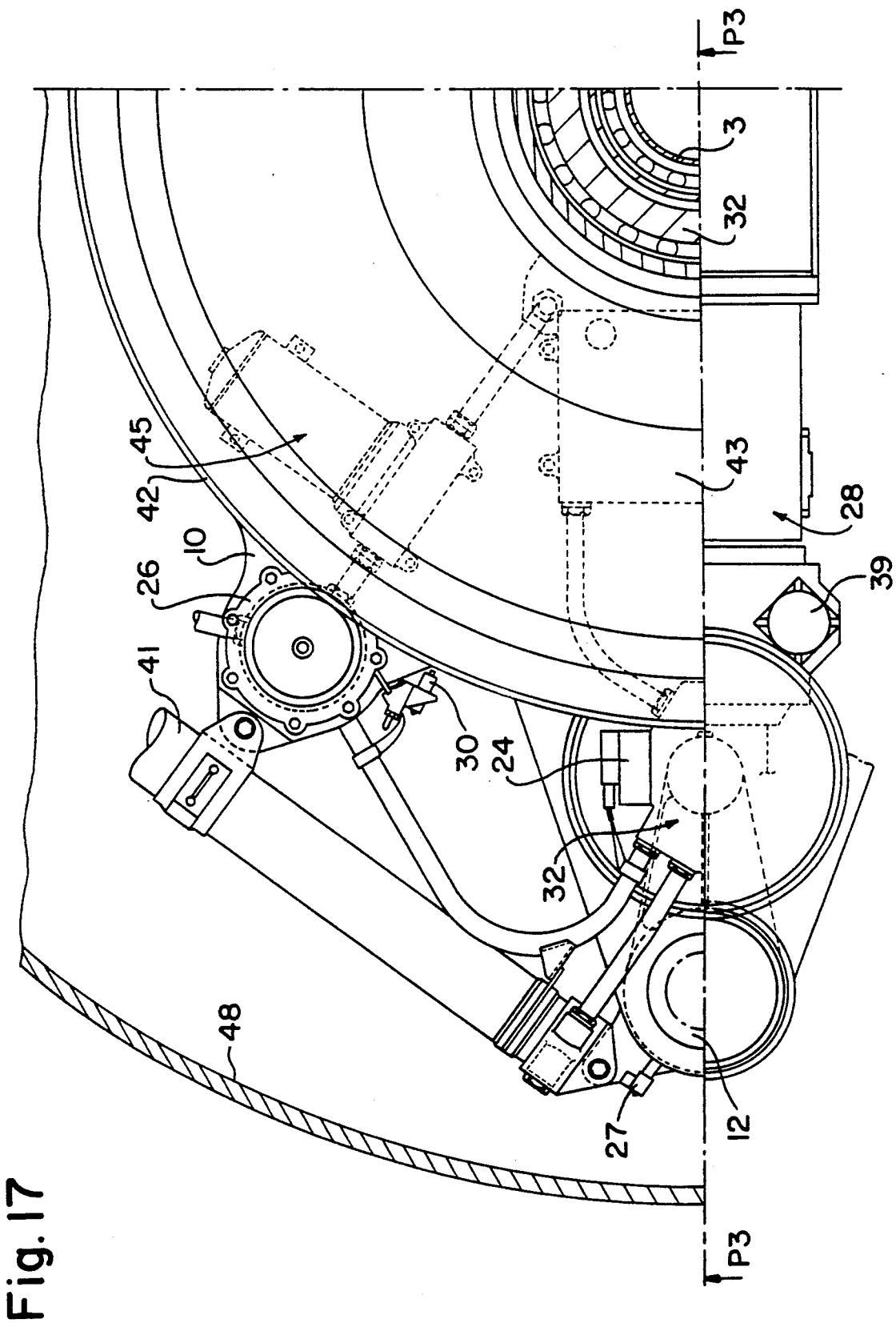
FIG. 17 is a partial transverse cross-sectional view along a broken line $P_4$.

FIG. 16 is a partial section of the rotor through a longitudinal plane $P_3$ passing through the axis of the rotor 3, through the motor shaft 8 and through the axis 12 of one profiled blade, the rotor being assumed to be in an angular position such that these three axes are coplanar. FIG. 17 is a cross-section orthogonal to the preceding one along a broken line $P_4$.

Shown in these figures are:

the rotor shaft 3 which is hollow and provided with hollow structures and contour structures for supporting and connecting the various assemblies, the motor shaft 8 which is orthogonal to the first and itself hollow and which receives the motive power of the motive group by the connection of a flexible coupling symbolized at 46, the axis 12 of the profiled blade concerned, the second transmission 33 comprised of a pair of gears, the phase shifter 28 mounted between the gears 33 and the motor shaft 8 with its ball screw 34, its ball screw nut 35, its screw jack 36, its ball stops 37, its endless screw 38, its sensor 40 permitting determination of the adjustment angle $\Psi_{mor}$, the control motor 39, the first transmission 31 of the kinematic chain comprising a pair of gears, the toothed wheel 32 coupled by the gears 33 to the screw nut 35 of the phase shifter, the flange 10 comprising the carrier structure of the rotor, beside the airframe, secured to the rotor shaft 3, the actuator 25 comprised by a rotary jack composed of a body 25a which engages the toothed wheel 32 and a shaft 25b, a pair of gears 47 mounted between this shaft 25b of the actuator and the axle 12 of the profiled blade, the distributor 24 hydraulically connected to the jack 25 by a rotating connection and supported by a bearing on the body of the jack 25a, one of the two hydraulic pumps 26, associated with each profiled blade concerned, supported by the flange 10 and engaging the fixed toothed wheel 42, said pump being connected to the distributor 24, the hydraulic accumulator 41 associated with the pump 26, supported by the flange 10 and hydraulically connected to the distributor 24, the heat exchanger 43, supported by the flange 10 and arranged on the return of the hydraulic circuit, the pressurized chamber 44, in the example of a toroidal shape, supported by the flange 10, the filter 45 arranged on the circuit of the pump 26, the sensor 27 measuring the instantaneous real geometric angle $\Psi_r$, the sensor 30 for measuring the aerodynamic azimuth $\phi$, a fixed housing 48 for protection assuring the retention of lubricating oil, this lubrication being carried out by jets of oil under high pressure with the help of conventional means not shown.

The transmission of electric information from the sensors, electrical orders to the destination of the actuators, and the feeding of the sensors is carried out in a known manner by a rotating collector mounted at the output of the shaft of the rotor 3, this transmission assuring the connection toward the corresponding electronic means mounted in the airframe 1 (calculators 17, 18 and 29, and sources of electric power).

I claim:

1. A process for controlling a rotor connected to an airframe movable in a fluid, for exerting at each instant on said airframe sustaining and/or propelling forces desired, said rotor comprising a carrier structure (5, 10, 11) mounted on said airframe (1) in such a manner as to be able to be rotationally driven about an axis of rotation (O) and at least one profiled blade (9) extending parallel to the axis of rotation (O) and articulated on said carried structure by a pivot connection on the axis (8) essentially parallel to said axis of rotation (O) at a rotational speed ($\omega$), and being characterized in that it comprises:

preliminarily storing data representative of the following structural parameters of the rotor: nE (the equivalent wingspan equal to the product of the number of profiled blades n of the rotor and the spread E of each profiled blade); R (the distance between the axis of rotation O and the axis B of the pivot connection); r (the distance on the chord of the profiled blade between the axis B and a point P situated essentially one quarter to the rear of the profile); a (coefficient of the congruent transformation of the profiled blade);

$$A = 2\pi(a_1 - a^2) + S$$
$$B = 2\pi(a_1 + a^2 - S)$$

$$C_1 = 2\pi\left(\frac{a_1 a_2}{a^2} + \frac{a_2 a_3}{a^4}\right) -$$

$$\pi(A_{-1} - a_1 A_1 - 2a_2 A_2 - 3a_3 A_3 \ldots)$$

where $a_1, a_2 \ldots a_i$ are the terms of the congruent transformation developed in the Laurent series, $A_{-1}, A_1, \ldots A_i$ are the terms of the product of the congruent transformation and its conjugate developed in the Laurentian series and S the surface normal to the profile, measuring and determining at each instant the relative speed (V) of displacement of the airframe with respect to the fluid, the speed of rotation $\omega$ of the rotor and the volumic mass $\rho$ of the fluid from measurements of the dynamic pressure, the static pressure and the temperature of the fluid, measuring and permanently determining during rotation, the aerodynamic azimuth $\phi$ of each profiled wing for generating a corresponding measurement signal, said aerodynamic azimuth being the algebraic angle formed by the direction of the relative wind and the plane M containing the axis of rotation O and the axis B of the pivot connection of the profiled wing considered, generating reference signals representative of the desired forces on the airframe (algebraic forces translated by their projections P and T respectively according to a direction perpendicular to the relative wind and according to the direction of the relative wind), determining permanently, for each profiled wing, from the stored parameters, from the measured and determined values, and from the reference signals, the instantaneous geometric angle $\Psi$ defined by the chord of the profiled wing and by the plane M corresponding to within $\pm 0.2$ radians to the following relationships (all angles being defined in the trigonometric sense):

$$\cos\phi_i = C\sin(\phi - \Psi) + \cos\Psi + \frac{r}{R\omega}\left(\omega - \frac{\delta\Psi}{\delta t}\right) \quad (1)$$

$$P = \frac{\eta E}{2}\pi \int_0^{2n} -f\left\{\left[\Gamma - B\left(\omega - \frac{\delta\Psi}{\delta t}\right)\right]m - \right. \quad (2)$$

$$\left. C_i\left(\omega - \frac{\delta\Psi}{\delta t}\right)^2 - A\frac{\delta l}{\delta t}\right\}\sin(\phi - \Psi)\cdot\delta +$$

$$\frac{\eta E}{2\pi}\int_0^{2n} f\left\{\left[\Gamma + A\left(\omega - \frac{\delta\Psi}{\delta t}\right)\right]l + \right.$$

$$\left. C_1\frac{\delta^2\Psi}{\delta t^2} - B\frac{\delta m}{\delta t}\right\}\cos(\phi - \Psi)\cdot\delta\phi$$

$$T = \frac{\eta E}{2\pi}\int_0^{2n} -f\left\{\left[\Gamma - B\left(\omega - \frac{\delta\Psi}{\delta t}\right)\right]m - \right. \quad (3)$$

$$\left. C_1\left(\omega - \frac{\delta\Psi}{\delta t}\right)^2 - A\frac{\delta l}{\delta t}\right\}\cos(\phi - \Psi)\cdot\delta\phi +$$

$$\frac{\eta E}{2\pi}\int_0^{2n} -f\left\{\left[\Gamma + A\left(\omega - \frac{\delta\Psi}{\delta t}\right)\right]l + \right.$$

$$\left. C_1\frac{\delta^2\Psi}{\delta t^2} - B\frac{\delta m}{\delta t}\right\}\sin(\phi - \Psi)\cdot\delta\phi$$

$$0 \leq \phi_{11} \leq \phi_{12} \leq \pi \quad (4)$$
$$\phi_i = \phi_{11} \text{ and } \Gamma = 4\pi a R\omega(\cos\phi_{11}) \text{ if } -\phi_{11} < \phi < \phi_{11} \quad (5)(a)$$
$$\phi_i = \phi \text{ and } \Gamma = 4\pi a R\omega(\cos\phi) \text{ if } \phi_{11} \leq \phi < \phi_{12} \quad (5)(b)$$
$$\phi_i = \phi_{12} \text{ and } \Gamma = 4\pi a R\omega(\cos\phi_{12}) \text{ if } \phi_{12} < \phi < 2\pi - \phi_{12} \quad (5)(c)$$
$$\phi_i = \phi \text{ and } \Gamma = 4\pi a R\omega(\cos\phi) \text{ if } 2\pi - \phi_{12} \leq \phi \leq 2\pi - \phi_{11} \quad (5)(d)$$

$$l = -R\omega[\sin\Psi + C\cos(\phi - \Psi)] \quad (6)$$

$$m = R\omega[\cos\Psi + C\sin(\phi - \Psi)] - \frac{\eta}{2}\left(\omega - \frac{\delta\Psi}{\delta t}\right) \quad (7)$$

and $$C = \frac{V}{\omega R} \quad (8)$$

and controlling the instantaneous geometric angle of each profiled wing at the value of the angle $\Psi$ obtained for said wing.

2. A process for controlling as in claim 1, characterized in that the instantaneous geometric angle $\Psi$ is determined by the following operations:

for the set of profiled blades:
determining preliminarily from a table of correspondence of the values between the parameters $\Psi_{11}$, $\Psi_{12}$, $$\frac{P}{C\omega^2\rho} \text{ and } \frac{T}{\omega^2\rho},$$

this table being determined by carrying out on the parameters $\Psi_{11}$, $\Psi_{12}$ (called commutation angles), the discrete values arranged in a series over the range of variation (4) and calculating for each pair of values ($\Psi_{11}$, $\Psi_{12}$) the values of the solutions $$\frac{P}{C\omega^2\rho} \text{ and } \frac{T}{\omega^2\rho},$$

of the equations (2), (3),
storing said table of correspondence,
calculating permanently the magnitudes $$C = \frac{V}{\omega \rho}, \frac{P}{C\omega^2 \rho}, \text{ and } \frac{T}{\omega^2 \rho}$$

as a function of the desired forces P and T and the parameters V, $\omega$ and $\rho$ determined, searching the correspondence table for retrieving the couple $$\frac{P}{C\omega^2 \rho}, \frac{T}{\omega^2 \rho}$$

closest to the corresponding calculated magnitudes and extracting the corresponding values of the parameters $\Psi_{11}$, $\Psi_{12}$, for each profiled blade:

resolving the differential equation (1), while giving to the parameters $\Psi_{11}$, $\Psi_{12}$ the values extracted from the table, for obtaining the searched for value of the instantaneous geometric angle $\Psi$ concerning the profiled blade considered.

3. A process for controlling as in claim 2, characterized in that, for the set of profiled blades:

the table of correspondence is stored in the form of a four column matrix corresponding to the values of $$\frac{P}{C\omega^2 \rho}, \frac{T}{\omega^2 \rho}, \phi_{11}, \phi_{12},$$

searching said table of correspondence consisting of reading the two columns $P/C\omega^2\rho$, $T/\omega^2\rho$, for identifying the pair closest to the values calculated and extracting the corresponding values of $\phi_{11}$ and $\phi_{12}$ in the two other columns.

4. A process of controlling according to claim 2 characterized in that for each profiled blade, the resolution of the differential equation (1) is carried out at each instant by a calculation having the following steps:

comparing the measured value $\phi$ to the angles of commutation $\phi_{11}$, $\phi_{12}$ for determining the value of $\phi_i$ by the relationships (5), utilizing the value of $\phi$, $\phi_i$ and the measured, calculated or stored parameters C, $\omega$, r, R, for resolving said differential equation by a RUNGE-KUTTA method.

5. A controlling process as in claim 2, characterized in measuring permanently the real value $\Psi_r$ of the instantaneous geometric angle of each profiled blade and introducing this real value into the calculator for serving as the integration constant in the resolution of the differential equation.

6. A controlling process as in claim 2, characterized in that the determination of the instantaneous geometric angle $\Psi$ is achieved, permanently, in a sequential manner while generating clock pulses of a high frequency with respect to the number of revolutions per second of the rotor, while reading the measurement and control signals at each clock pulse, and between two clock pulses, while carrying out the calculations for determining the value of the instantaneous angle $\Psi$.

7. A process for controlling as in claim 2, characterized in that the control of the instantaneous geometric angle of each profiled blade comprises:

assuring an average control of the set of said profiled blades according to a average cyclic law of incidence $\Psi_m = f(\phi)$ by a reversible kinematic chain able to provide or recover energy according to the load characteristics of the profiled blades, assuring a complementary control of each profiled blade, from the calculated value of the instantaneous geometric angle $\Psi$, while adjusting at each instant an additional incidence $\Psi_c = \Psi - \Psi_m$ by means of an actuator.

8. A rotor intended to be rotated in a fluid for developing on an airframe (1) desired lifting and propelling forces (P, T), comprising a carried member (5, 10, 11) adapted to be mounted on said airframe in such a manner as to be able to be driven in rotation about an axis of rotation (O) and at least one profiled blade (9) extending parallel to the axis of rotation (O) and articulated on the carrier member by a pivot connection about an axis (B) essentially parallel to the axis of rotation (O), said rotor being characterized in that it comprises:

means (13) for storing specific data about the rotor, means (14, 30) for measuring and determining the relative speed (V) of displacement of the airframe, the speed of rotation ($\omega$ of the rotor and the volumic mass of the fluid ($\rho$), means (14, 30) for measuring and determining the aerodynamic azimuth ($\phi$) of each profiled blade curing the rotation, means (15) for generating control signals representative of the desired forced (P, T), means (17, 18) for calculating the instantaneous geometric angle ($\Psi$) of each profiled blade as a function of the stored data, the determined values and the control signals, operating means (22, 23, 28) for each profiled blade, adapted to adjust at each instant the angular position of the blade to a calculated value ($\Psi$) issued from the calculating means.

9. A rotor as in claim 8, characterized in that it comprises a sensor (27) for measuring the real value $\Psi_r$ of the instantaneous geometric angle of each profiled blade, the operating means being of a closed loop type, adapted to receive the real value $\Psi_r$ and a parameter related to the calculated value $\Psi$ and assuring the angular adjustment of the position of the profiled blade considered tending to reduce at each instant the angular variation $\Psi - \Psi_r$.

10. A rotor as in claim 9, characterized in that the operating means comprises:

a kinematic chain (22), common to the set of the profiled blades (9) and of a mechanical structure adapted to generate an output of rotation according to an average cyclic law of incidence $\Psi_m$, a hydraulic distributor with a servovalve (24) associated with each profiled blade, said distributor receiving a signal representative of the angular variation $\Psi - \Psi_r$ for the profiled blade considered and being adapted to generate a hydraulic power directly related to said angular variation, and a rotary hydraulic actuator (25) associated with each profiled blade and receiving the hydraulic power from the corresponding distributor (24), said actuator comprising a body movable in rotation (25a) driven by the kinematic chain (22) according to the average law $\Psi_m$, an output shaft (25b) coupled to the profiled blade considered for fixing the angular position thereof.

11. A rotor as in claim 10, characterized in that the kinematic chain (22) comprises a phase shifter (28) adapted to permit a predetermined adjustment of the origin of the cyclic law of incidence $\Psi_m$.

12. A rotor as in claim 11, characterized in that the kinematic chain comprises:
- a motor shaft (8) arranged to receive driving motive power from the rotor,
- a rotor shaft (3) arranged along the axis of rotation of the rotor and coupled by a first transmission (31) to the motor shaft (8) for rotationally driving the rotor,
- a toothed wheel (32) centered on the rotor shaft (3) and coupled by a second transmission (33) to the phase shifter (28), said toothed wheel driving the body (25a) of the rotary actuator associated with each profiled blade,
- a carrier structure flange (10) connected to the rotor shaft (3) and supporting the bodies (25a) of the actuators and the axles (12) carrying the profiled blades,
- the phase shifter (28), of a mechanical nature, arranged to assure a relative angular adjustment $\Psi_{mo}$ between the first transmission (31) and the second transmission (33).

13. A rotor as in claim 12, characterized in that the mechanical phase shifter comprises:
- a reversible ball screw (34) carried by the motor shaft (8) for turning therewith and movable in translation along this motor shaft,
- a screw nut (35) connected to the second transmission (33) and cooperating with the ball screw (34) in such a manner as to generate a rotation of said nut connected to the translation of the ball screw,
- a screw jack (36) connected through ball stops (37) to the ball screw (35) for being able to move it along the motor shaft,
- an endless screw (38) coupled to the screw jack (36) for actuating it, this endless screw being provided with a phase shifting control motor (39).

14. A rotor as in claim 10, characterized in that the hydraulic distributor with a servo-valve (24) associated with each profiled blade (9) is connected to at least one hydraulic feed pump (26) associated with a hydraulic accumulator (41), arranged in such a manner that said hydraulic accumulator is under load in the event of excess power available on the pump and in restitution in the opposite case.

15. A rotor as in claim 14, characterized in that the hydraulic feed pumps (26) are carried by the carrier structure (10) in order to rotate therewith and are mechanically coupled to a fixed toothed ring (42) for rotationally driving each of said pumps.

16. A rotor as in claim 8, characterized in that:
- the profiled blades (9) are articulated on two flanges (10, 11) situated on opposite sides of said carrier structure,
- said flanges are connected by the rotor shaft (3) and coupled into rotation therewith,
- each profiled blade (9) is supported by axles (12) supported by the flanges (10, 11) and driven in rotation by a transmission (47), itself connected to the hydraulic actuator (25) associated with the blade considered.

17. A rotor as in claim 8, comprising five profiled blades (9) distributed about the rotation shaft (3) of said rotor.

18. A rotor as in claim 8, mounted on the airframe of an aircraft (1), in which the rotor shaft (3) is, on one side, carried by a hub (4) connected to the airframe of the aircraft and on the other side supported by a fixed profiled member (5) provided with a bearing, said member extending so as to be attached to the airframe.

19. An aircraft comprising at least one rotor according to claim 18 and a motor group integrated to its airframe and coupled to the motor shaft (8) of each rotor.

* * * * *